Oct. 2, 1945.   J. B. ARMITAGE ET AL   2,385,907
MACHINE TOOL POWER TRANSMISSION AND CONTROL MECHANISM
Filed Aug. 3, 1940   10 Sheets-Sheet 4

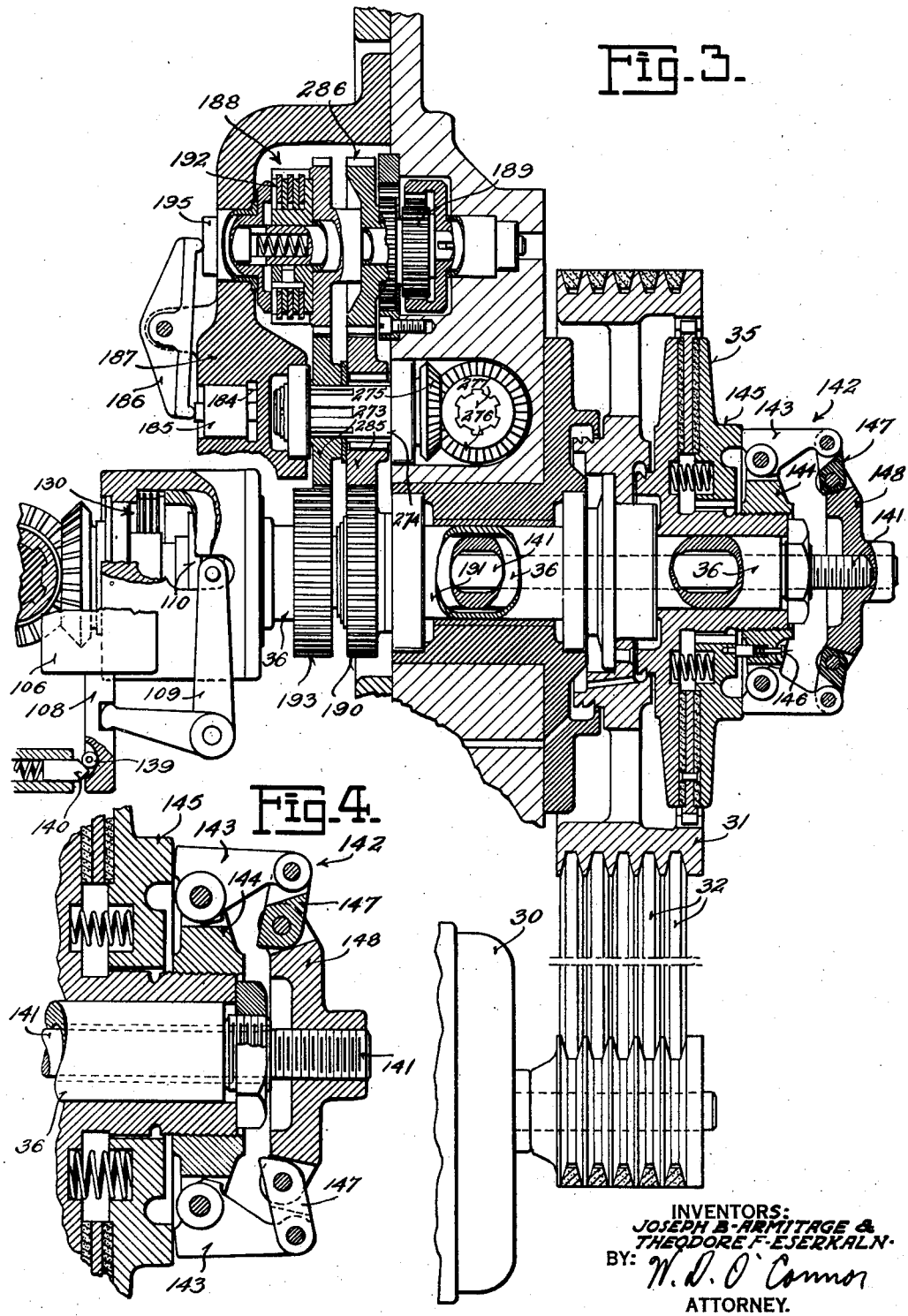

INVENTORS:
JOSEPH B. ARMITAGE &
THEODORE F. ESERKALN
BY: W. D. O'Connor
ATTORNEY.

Oct. 2, 1945.   J. B. ARMITAGE ET AL   2,385,907
MACHINE TOOL POWER TRANSMISSION AND CONTROL MECHANISM
Filed Aug. 3, 1940   10 Sheets-Sheet 5
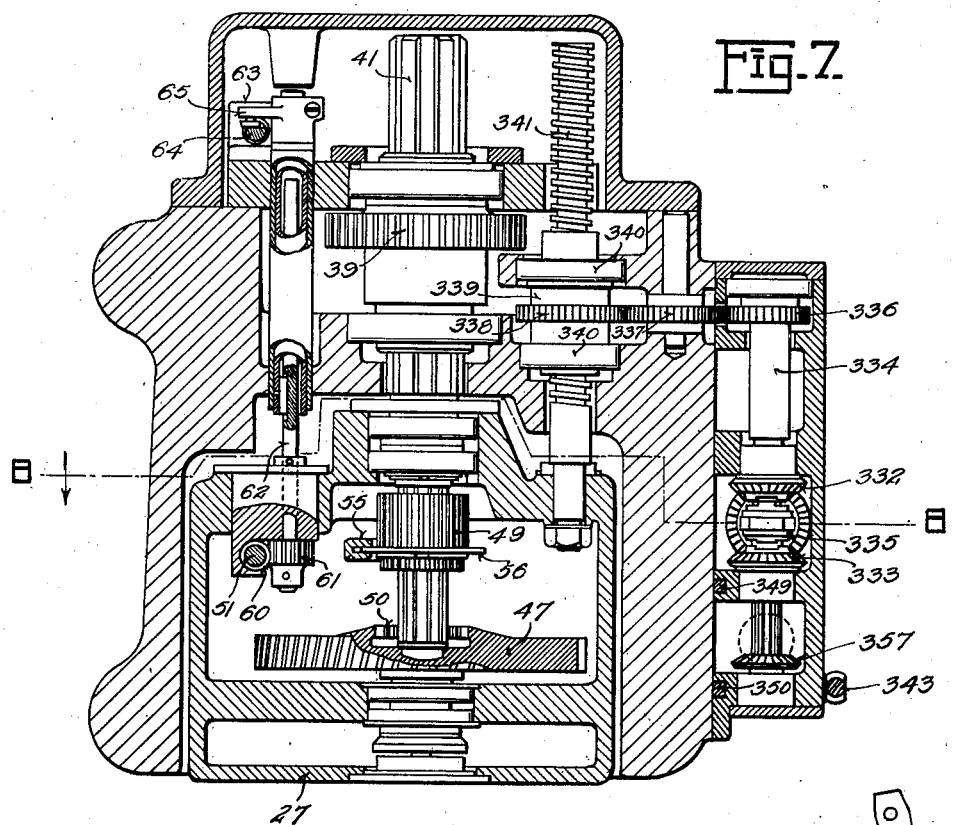
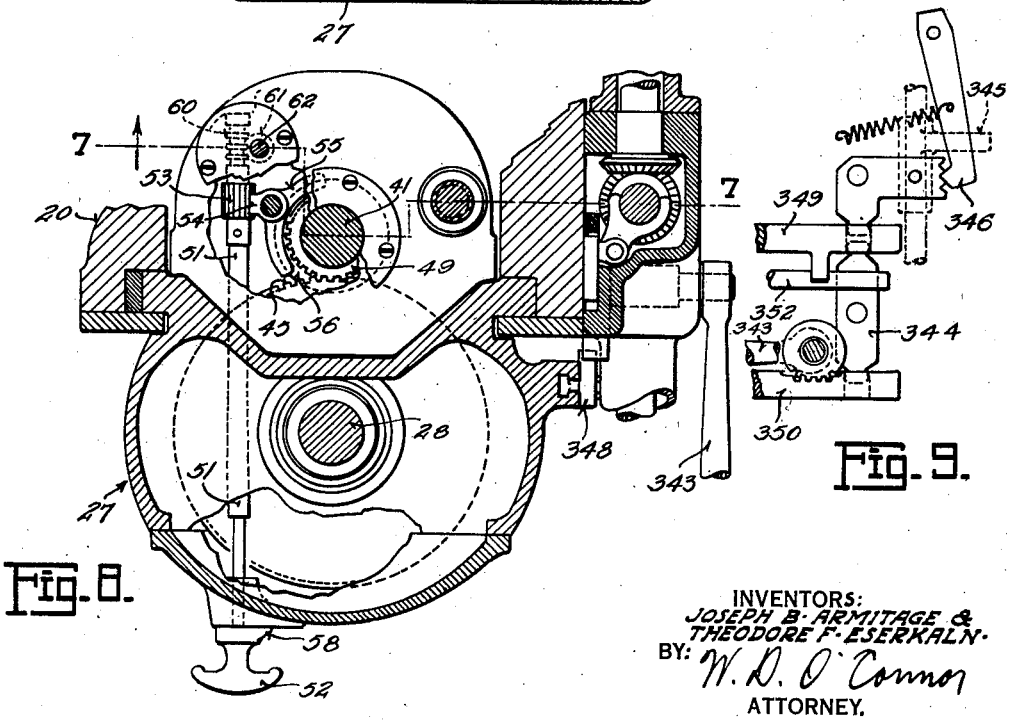
INVENTORS:
JOSEPH B. ARMITAGE &
THEODORE F. ESERKALN.
BY: W. D. O'Connor
ATTORNEY.

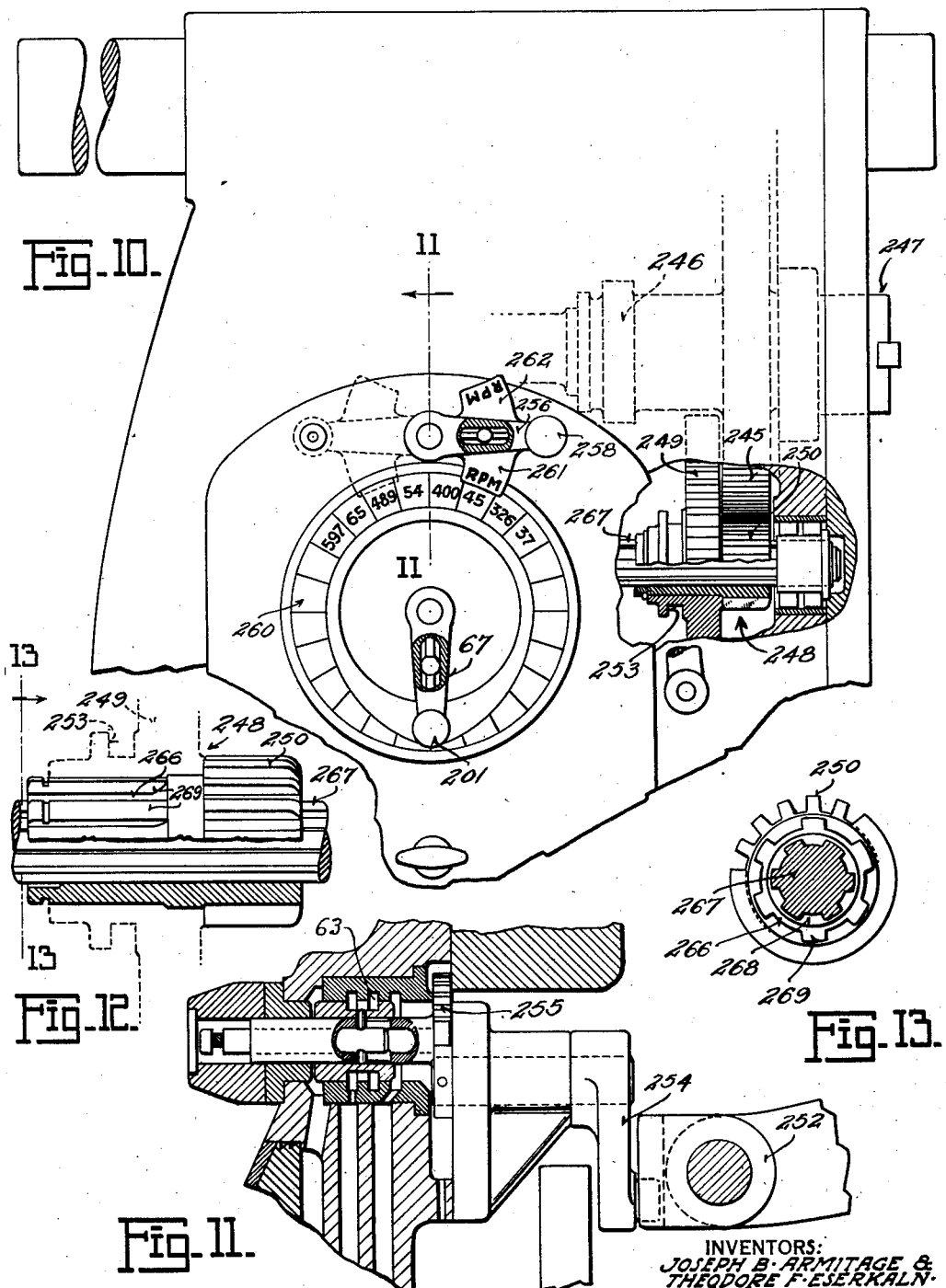

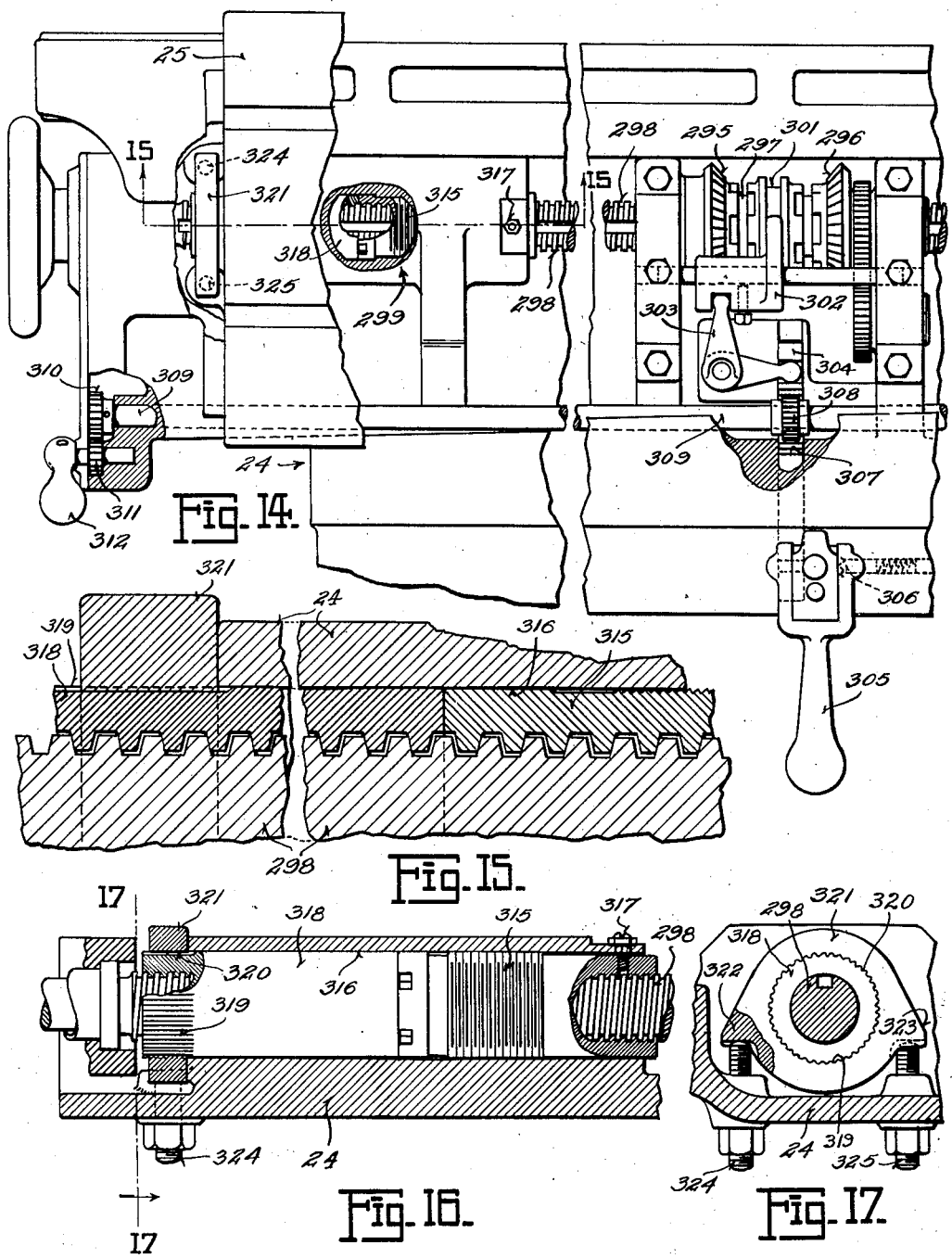

Oct. 2, 1945.   J. B. ARMITAGE ET AL   2,385,907
MACHINE TOOL POWER TRANSMISSION AND CONTROL MECHANISM
Filed Aug. 3, 1940   10 Sheets-Sheet 8
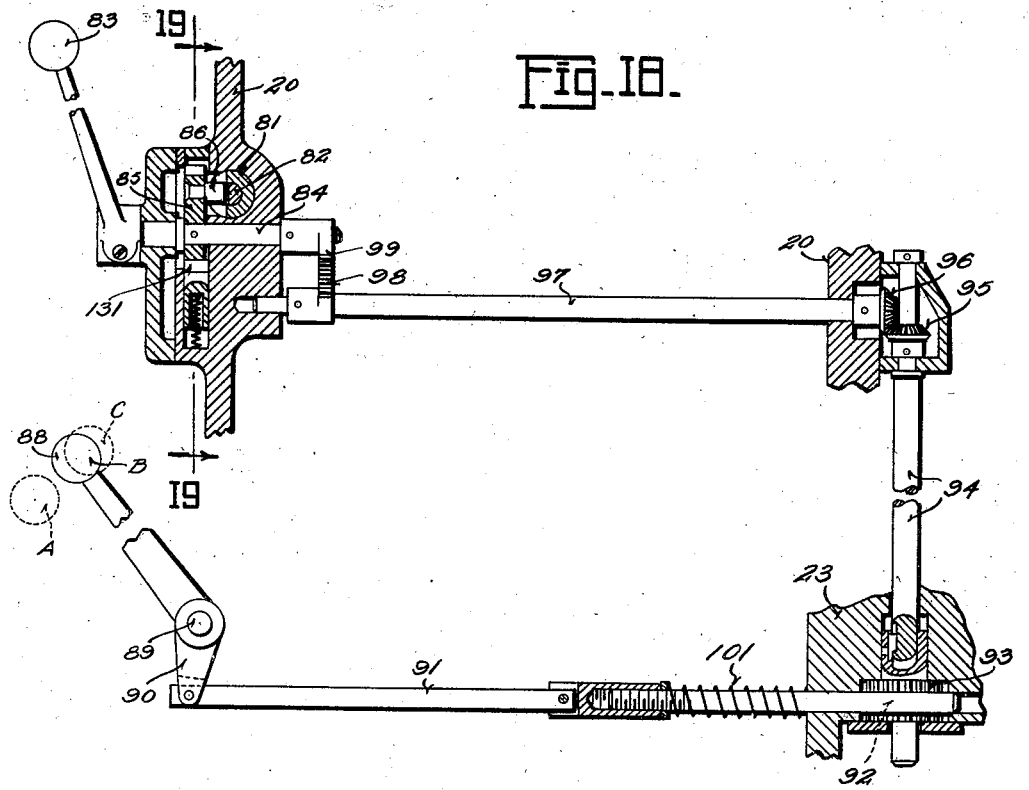
Fig. 18.
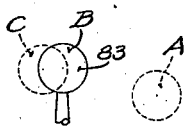
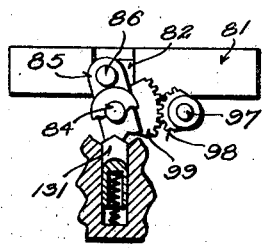
Fig. 19.
INVENTORS:
JOSEPH B. ARMITAGE &
THEODORE F. ESERKALN
BY: W. D. O'Connor
ATTORNEY.

Patented Oct. 2, 1945

2,385,907

UNITED STATES PATENT OFFICE 2,385,907

MACHINE TOOL POWER TRANSMISSION AND CONTROL MECHANISM

Joseph B. Armitage and Theodore F. Eserkaln, Wauwatosa, Wis., assignors to Kearney & Trecker Corporation, West Allis, Wis., a corporation of Wisconsin Application August 3, 1940, Serial No. 350,666

33 Claims. (Cl. 90—19)

This invention relates generally to machine tools and more particularly to improved mechanism for transmitting power to and for controlling its effect upon various actuating elements of a machine tool.

A general object of the invention is to provide improved power transmitting and controlling mechanism for actuating the movable parts of a machine tool.

Another object of the invention is to provide an improved hydraulically actuated control system for regulating the operation of a machine tool.

Another object is to provide an improved control system for the main driving mechanism of a machine tool that is arranged to be operated hydraulically either by action of a control lever on the frame of the machine or by action of a control lever carried by a movable element of the machine.

Another object is to provide an hydraulically actuated main clutch controlling system for a milling machine arranged to be operated by a clutch lever at a rear control station on the machine column or by a clutch lever at a front control station on the movable knee of the machine.

Another object is to provide an improved hydraulic control system for a machine tool arranged to cause disengagement of the main driving clutch prerequisite to a shifting operation and functioning to prevent reengagement of the clutch by action of the shifting lever following the shifting operation.

Another object is to provide a milling machine of the vertical spindle type, in which the main clutch is controlled by a shifting lever carried on the movable vertical head of the machine.

Another object is to provide an improved speed indicating apparatus for a machine tool.

Another object is to provide an improved range change shifting mechanism for a machine tool.

Another object is to provide an improved speed changing mechanism arranged to be turned slowly while being shifted either in response to movement of a shifting lever on the machine frame or in response to movement of a shifting lever on a movable element of the machine.

Another object is to provide an improved slow speed drive mechanism for facilitating gear shifting, in which a hydraulic actuating cylinder is carried by the element supporting the slow speed driving clutch.

Another object is to provide means for controlling the slow speed driving arrangement from a shifting lever on the sliding head of a vertical milling machine.

Another object is to provide improved driving mechanism for moving the vertical head of a milling machine.

According to this invention, a milling machine is provided with an improved power transmission and control mechanism including a control system for shifting the main driving clutch, arranged to be operated hydraulically from a plurality of sources. For manual control of the machine, the hydraulic clutch controlling system may be actuated either by a lever on the column of the machine or by a lever carried by the movable knee of the machine. For automatic control, the main clutch actuating mechanism is interlocked with the speed changing mechanism in such manner that the clutch is moved to disconnecting position by the hydraulic control system upon unlatching movement of either a speed changing gear shifting lever or a range changing gear shifting lever. To avoid unintentional starting of the machine after a speed changing operation, the system is arranged to prevent reengagement of the main clutch upon relatching movement of either shifting lever, restarting of the machine being possible only under the positive control of the operator by actuation of one or the other of the manually operated clutch controlling levers. The hydraulic control system furthermore effects engagement of an improved slow speed driving arrangement to turn the transmission mechanism slowly for facilitating the gear shifting operation. In a machine of the horizontal type, the range changing lever cooperates with a speed indicating dial associated with the speed changing lever, the dial presenting two series of indicia alternately arranged and angularly displaced relative to each other for cooperating with an indicator on the range changing lever at angularly spaced positions. In a machine of the vertical spindle type, the range changing mechanism is carried in the sliding vertical head and a mechanical connection is arranged between the range changing mechanism in the head and the hydraulic control system in the column for effecting disengagement of the main clutch and engagement of the slow speed drive upon unlatching movement of the range change shifter. In this instance the angularly spaced positions associated with the speed dial are indicated by characters identified with the two positions assumed by the range changing shifter on the sliding head.

The invention is exemplified herein by embodiments illustrated in connection with a general representation of a typical machine tool structure; however, it is to be understood that the particular embodiments shown are intended to be illustrative only and that various other structural forms, within the range of equivalents of the features defined in the subjoined claims, may be utilized in practicing this invention in connection with any of various other machine tools or similar apparatus.

The foregoing and other objects of this invention, which will become more fully apparent from the following detailed specification, may be achieved by the particular apparatus that is depicted in and described in connection with the accompanying drawings, in which:

Fig. 3 is a developed view generally in vertical section through the machine, taken along the line 3—3 in Fig. 2 and showing the driving mechanism;

Fig. 4 is an enlarged fragmentary view of the clutch actuating linkage shown in Fig. 3;

Fig. 7 is a view in vertical transverse section through the upper part of the machine showing the spindle driving and feeding mechanism, taken along the line 7—7 in Fig. 8;

Fig. 8 is a view in horizontal section through the spindle supporting and driving structure taken along the line 8—8 in Fig. 7;

Fig. 9 is a fragmentary view in right side elevation of the spindle head tripping mechanism shown in Fig. 8;

Fig. 10 is a view in left side elevation of the upper portion of a milling machine of the horizontal spindle type, showing the speed indicating mechanism and other features utilized in this type of machine;

Fig. 11 is a fragmentary view in vertical section of the range changing mechanism for the horizontal type machine, taken along the line 11—11 in Fig. 10;

Fig. 12 is an enlarged detailed view, partly in vertical section, of a splined connecting sleeve shown in Fig. 10;

Fig. 13 is a view of the connecting sleeve taken partly in transverse section along the line 13—13 in Fig. 12;

Fig. 14 is a fragmentary plan view of the work supporting structure with parts broken away to show the transmission and control mechanism;

Fig. 15 is an enlarged fragmentary, somewhat diagrammatical view illustrating the operation of the feed screw and nut adjusting mechanism shown in Fig. 14;

Fig. 16 is a fragmentary view, showing the details of the nut adjusting mechanism;

Fig. 17 is a transverse sectional view of the screw and nut adjusting mechanism, taken along the line 17—17 in Fig. 16;

Fig. 18 is a fragmentary view showing the main clutch and brake controlling levers and their interconnecting linkage;

Fig. 19 is a view in vertical section along the line 19—19 in Fig. 18;

Fig. 20a is an end view of a handle portion of Fig. 20; and

Figure 1:
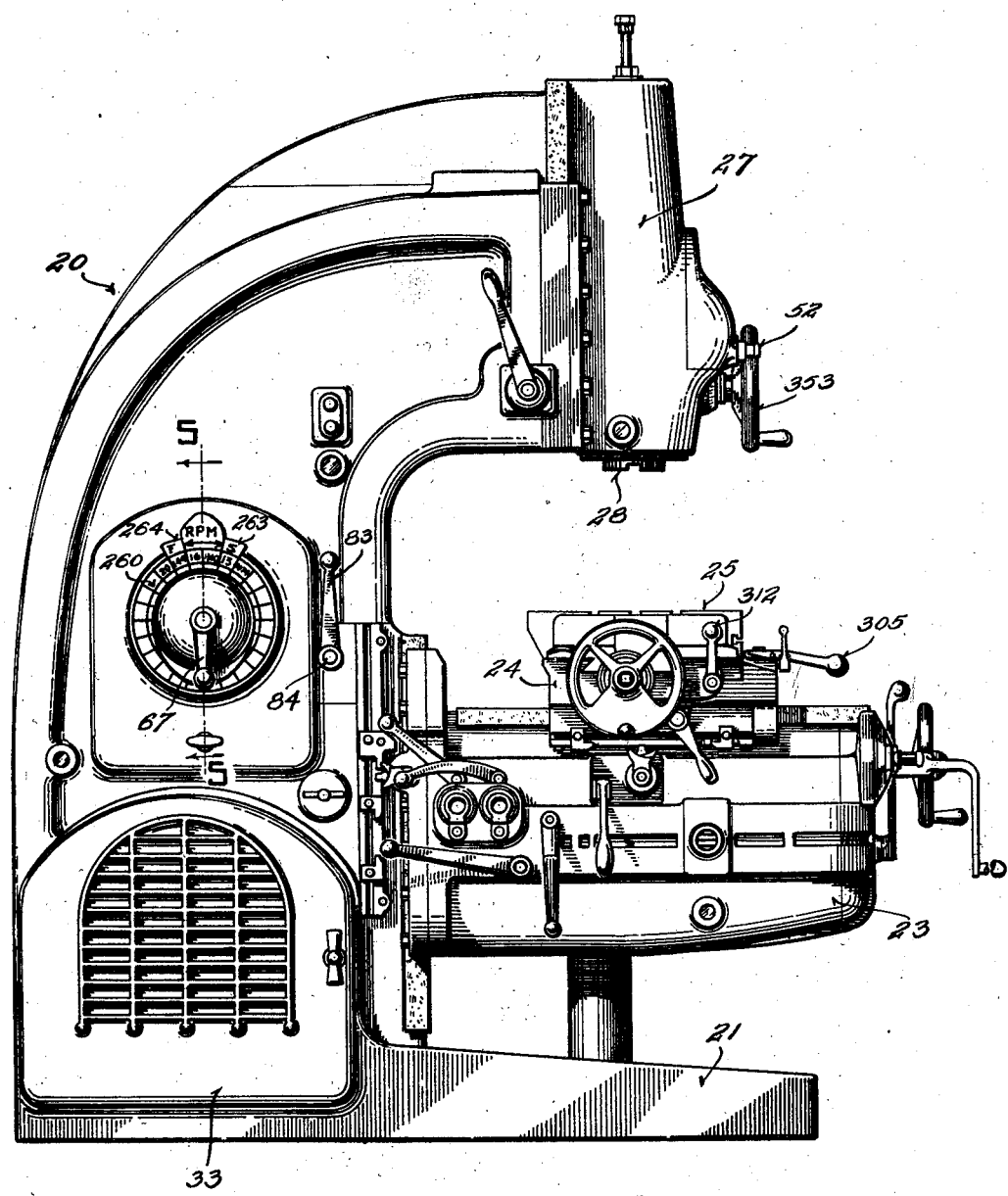
Figure 1 is a view in left side elevation of a vertical spindle milling machine exemplifying a machine tool in which the features of the present invention may be incorporated to advantage.
Figure 2:
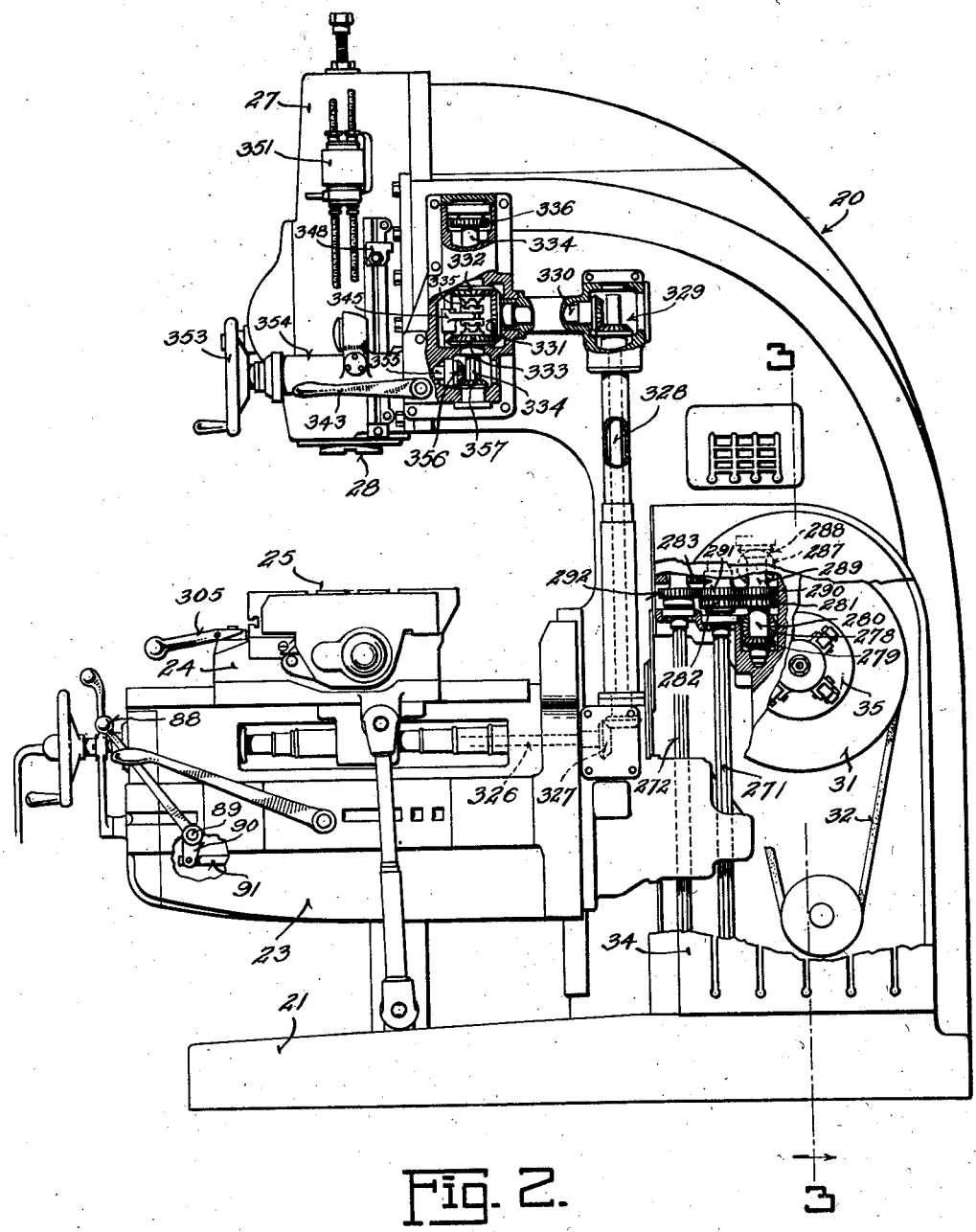
Fig. 2 is a view in right side elevation of the same machine, parts having been broken away to show some of the internal mechanism.

The machine tool shown generally in Figs. 1 and 2 of the drawings as exemplifying a preferred embodiment of the invention, is a milling machine of the vertical spindle, knee and column type, although it is to be understood that various of the inventive features set forth herein may be incorporated in and utilized with advantage in machines of different construction.

Referring more specifically to the drawings, and particularly to Figs. 1 and 2 thereof, the milling machine there shown comprises essentially an upstanding hollow column 20 formed integrally with a forwardly projecting base 21 and constituting a supporting frame carrying the cooperating work supporting and tool supporting elements of the machine.

The work supporting element of the machine includes a knee structure 23 mounted on the front face of the column 20 for vertical sliding movement therealong and carrying a saddle structure 24 slidably mounted on the top thereof for horizontal transverse movement toward or from the column. The saddle 24 supports, in turn, a work supporting table 25 that is slidably mounted thereon for horizontal longitudinal movement, the cooperative action of the several slidably mounted structures being such that a workpiece mounted on the table 25 may be moved along any one of three mutually transverse paths.

The tool supporting element of the machine includes a spindle supporting or tool carrying head 27 slidably mounted for vertical movement on the forwardly projecting upper part of the column 20 in manner to support a vertically disposed rotatably mounted tool carrying spindle 28 in cooperating relationship with the work table 25.

Figure 5:
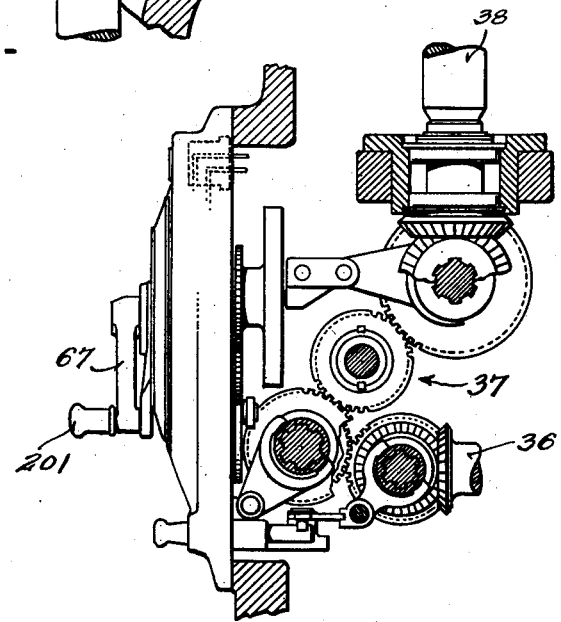
Fig. 5 is a fragmentary view of another part of the transmission mechanism, taken generally in vertical section along the line 5—5 in Fig. 1.

Power for moving the slidably mounted work supporting elements and for rotating the cutter supporting spindle, is derived from a motor 30, indicated in Fig. 3, that is preferably mounted in the base of the column 20. From the motor 30, the power is transmitted to a main driving pulley 31, by means of multiple belts 32, the motor being accessible by opening a louvered door 33 on the left side of the machine and the belt driving mechanism being enclosed by a door 34 on the right side of the machine. The main pulley 31 may be connected selectively, by means of a main disconnecting friction clutch 35, to transmit power through a main driving shaft 36 to a speed changing and reversing mechanism 37 (shown in Fig. 5) housed within the column and generally similar in construction and operation to the mechanism shown in copending application Serial No. 146,581, filed June 5, 1937, that issued May 6, 1941, as Patent No. 2,240,973.

Figure 6:
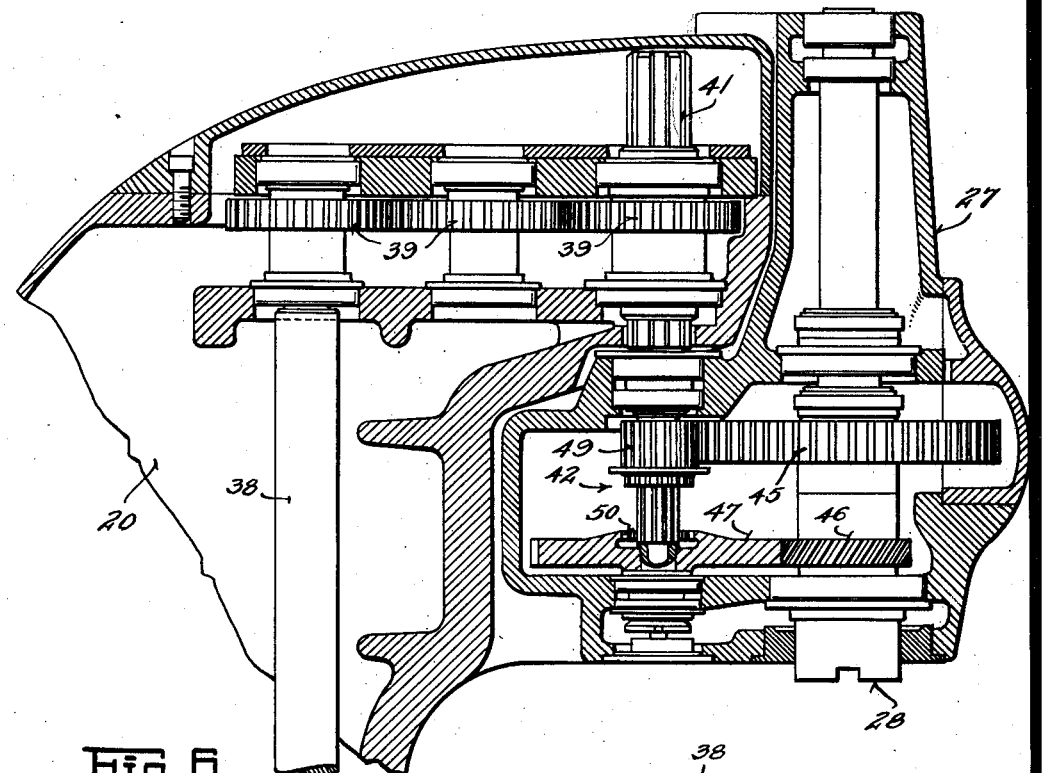
Fig. 6 is a fragmentary view in vertical section through the upper part of the milling machine, showing the spindle driving mechanism.

From the speed changer 37, power is transmitted by means of a vertical shaft 38 and a horizontal gear train 39 mounted in the top of the column as shown in Fig. 6, to a vertically disposed splined shaft 41 which is journalled in the sliding head 27 for vertical movement therewith while maintaining driving connection with the gear train 39 in the overhanging forward end of the column. Within the sliding head 27, the shaft 41 transmits power to the vertical spindle 28 by means of a range changing mechanism 42, whereby the spindle may be operated in either a high speed range or a low speed range.

As appears in Figs. 6, 7 and 8, the spindle driving range changing mechanism includes a relatively large gear wheel 45 fixed on the spindle 28 and a relatively small gear wheel or pinion 46 likewise fixed on the spindle 28 the pinion 46 being positioned below and spaced from the large gear wheel 45. Disposed in cooperating constant meshing engagement with the pinion 46 on the spindle 28 is a relatively large driving gear wheel 47 that is rotatably mounted concentrically with the driving shaft 41, the teeth of the gear wheel 47 and of the pinion 46 being preferably of helical or spiral type. For selecting the range of operation, there is slidably splined on the shaft 41 a shifting pinion 49 that is adapted when in its upper position of operation, to mesh with the large gear wheel 45 on the spindle 28, and when in its lower position of operation to interlock with internal teeth 50 formed in the upper end of the hub of the driving gear wheel 47 to thereby effect a driving connection between the shaft 41 and the driving gear wheel 47.

Figure 20:
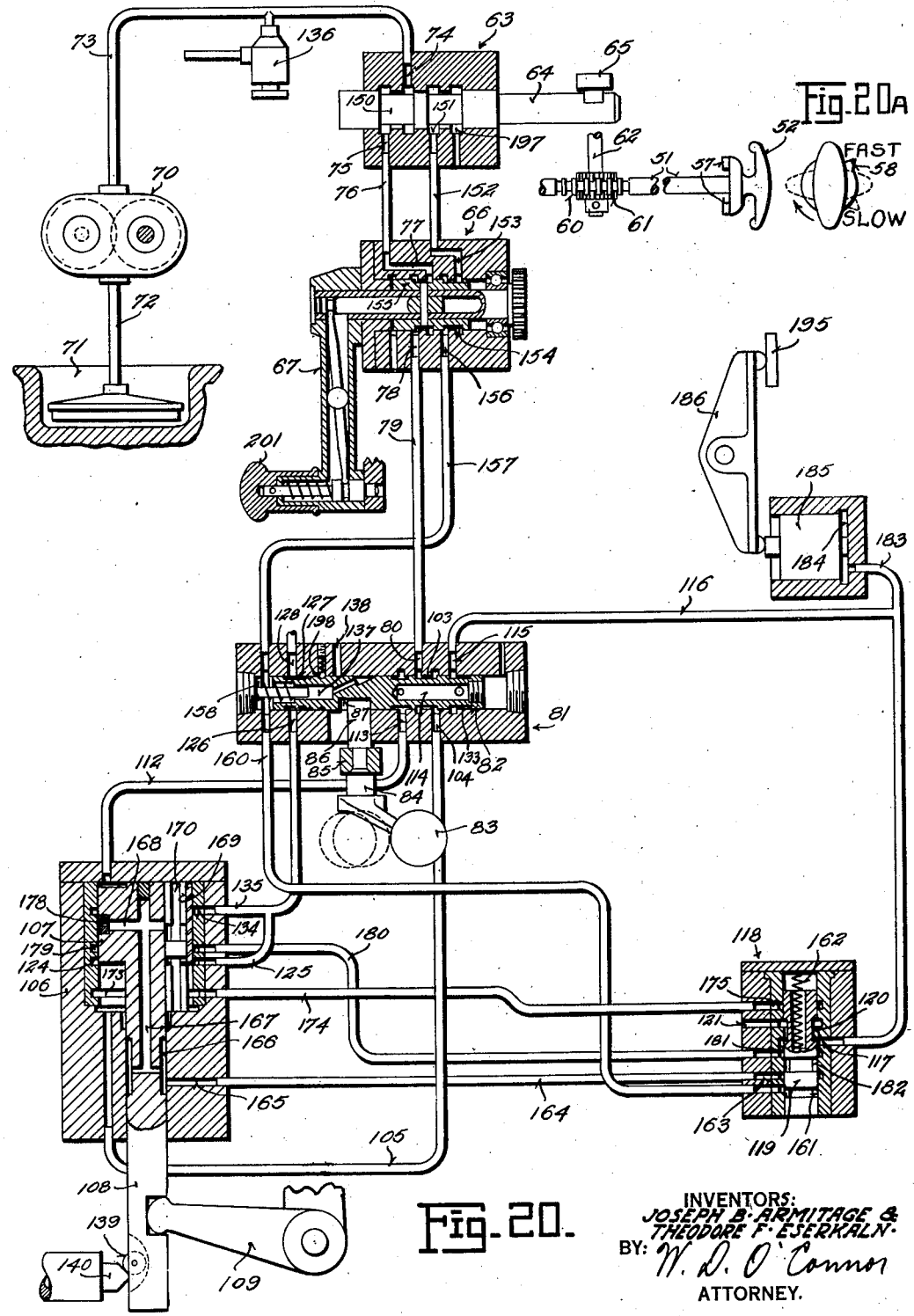
Fig. 20 is a schematic diagram of the hydraulic control system for actuating the clutch and brake mechanism.

For shifting the range changing pinion 49, there is provided a rotatably and axially movable shifting shaft 51, shown in Figs. 7 and 8, that is journalled in horizontal position in the sliding head 27. Manually actuatable lever means for moving the shaft 51 is provided by an actuating handle or knob member 52 on the end of the shaft that projects at the front of the sliding head 27, as appears in Figs. 1, 8 and 20. As shown in Fig. 8, the shaft 51 is provided with a pinion element 53 that meshes with a cooperating rack 54 formed on a vertically slidable shifting fork 55 that engages a shifting ring 56 fixed on the pinion 49, in manner to provide for vertical sliding movement of the pinion upon rotary movement of the shaft 51. For maintaining the shiftable pinion 49 in either of its operating positions, the shifting handle 52 is provided with a pair of inwardly projecting lugs 57, as shown in Fig. 20, the lugs being arranged to engage either of two pairs of complementary latching holes in the face of the head 27. The handle 52 is further provided with an indicating pointer 58 adapted to indicate the fast or slow position of the range change pinion by characters on the front of the head, as shown in Fig. 20a.

Upon axial unlatching movement of the range changing shaft 51, a hydraulic control system in the column 20 is actuated, by means of connecting mechanical linkage, to cause disengagement of the main driving clutch 35 and engagement of an auxiliary slow speed driving connection for facilitating the shifting operation. As appears in Figs. 7, 8 and 20, the shaft 51 is provided with a circular rack 60 cooperating with a pinion 61 on the lower end of an extensible shaft mechanism 62. The extensible shaft 62 constitutes a rotatable and slidable mechanical connection between the range changing shifter in the sliding head 27 and a hydraulic control valve 63 mounted in the upper part of the column 20 the valve being provided with a valve piston 64 that is engaged for operation by an arm 65 fixed on the upper end of the extensible shaft mechanism 62. The valve 63 in the top of the column associated with the range changing mechanism constitutes part of a hydraulic control system that includes a generally similar valve 66 associated with a speed changing lever 67 mounted on the left side of the machine, as shown in Fig. 1, and operatively connected to actuate the speed changing mechanism 37 in manner generally similar to that disclosed in the previously mentioned copending application Serial No. 146,581, filed June 5, 1937, now Patent No. 2,240,973, dated May 6, 1941. The hydraulic control system functions in manner similar to that of the system disclosed in copending application Serial No. 255,848, filed February 11, 1939, now Patent No. 2,345,171, dated March 28, 1944, in that unlatching movement of either the range changing control handle 52 or the speed changing lever 67 prerequisite to a range changing or speed changing shifting movement, causes the main clutch 35 to be shifted to disconnecting position and a slow speed drive mechanism to be engaged for facilitating gear changing, in the manner set forth and claimed in Reissue Patent No. Re. 21,434.

As is indicated diagrammatically in Fig. 20, fluid pressure for the hydraulic control system is derived from a pump 70 that withdraws hydraulic fluid, for instance lubricating oil, from a sump 71 through a conduit 72, the sump 71 and the pump 70 being disposed in that part of the hollow column 20 which houses the speed changing mechanism 37.

From the pump 70, the hydraulic fluid under pressure flows through a conduit 73 to a port 74 in the range changer actuated valve 63 and thence through an interconnected opening to a port 75 from which a conduit 76 leads to port 77 in the speed changer actuated valve 66. As shown, the port 77 in the valve 66 is in communication with a port 78 from which a conduit 79 leads to a port 80 in the casing of a clutch actuating control valve 81. The clutch controlling valve 81 is provided with a valve piston 82 that is arranged to be actuated either hydraulically, as the result of movement of the control valve 63 or 66, or manually by means of either of two clutch controlling levers, one being mounted on the column of the machine and the other on the movable knee.

As appears in Fig. 1, one of the clutch controlling levers, designated 83, is pivotally mounted on the left side of the column 20 adjacent to the speed changing lever 67 and in the region known as the rear control position. The lever 83 is fixed on the outer end of a control shaft 84 journalled in the side of the column as best shown in Figs. 18 and 20, the shaft carrying an arm 85 from which a pin 86 projects into an elongated actuating notch 87 in the side of the valve plunger 82, whereby the plunger may be moved longitudinally within the valve casing 81 by sidewise rocking movement of the lever 83, the valve being mounted in the side wall of the column above the shaft 84.

The other of the clutch controlling levers, designated 88, is pivotally mounted on the right side of the movable knee 23 near the front thereof and in the region of the forward control position, as shown in Fig. 2. The lever 88 is carried on a shaft 89 having a depending crank arm 90 which engages one end of a connecting link 91 extending rearwardly within the knee toward the column 20. At its inner end, the connecting link 91 is provided with rack teeth 92 (as shown in Fig. 18) which mesh with a pinion 93 rotatably mounted in the knee structure and having sliding connection with a vertically disposed shaft 94 journalled in the column 20. The control shaft 94 is provided at its upper end with a bevel pinion 95 that meshes with a similar bevel pinion 96 on one end of a transverse control shaft 97. The transverse shaft 97 is provided at its left end with a gear segment 98 that meshes with a similar gear segment 99 fixed on the inner end of the control shaft 84, the arrangement being such that when the clutch controlling lever 88 on the knee is actuated, it causes the control shaft 84 and its connected clutch lever 83 to move, thereby actuating the clutch controlling valve piston 82 as previously explained. For counterbalancing the weight of the lever 88 on the knee, the connecting link 91 is provided with a compression spring 101 acting in direction tending to move the lever 88 upward.

With the clutch controlling lever 83 in position A, shown in full lines in Fig. 20, the valve plunger 82 is so positioned that a groove 103 therein establishes communication between the pressure port 80 and a port 104 from which a conduit 105 leads to the lower end of a clutch actuating cylinder 106 for exerting pressure upon the lower face of a cooperating piston 107 therein. Pressure on the lower side of the piston 107 moves it upward within the cylinder 106, and exerts force through a piston rod 108 attached to the piston and depending from the cylinder, upon one arm of a bell crank 109, as best shown in Fig. 3. The cylinder 106 and the bell crank 109 are so positioned within the column 20 that the other arm of the bell crank 109 engages a shifting collar 110 that is operatively connected, as shown in Fig. 3, to actuate the main clutch 35, the arrangement being such that when the piston 107 is moved upwardly, the main clutch 35 is engaged to effect a driving connection between the driven pulley 31 and the main shaft 36 of the transmission mechanism within the column 20. Any liquid that may be trapped in the upper end of the cylinder 106 as the piston 107 moves upwardly is expelled through a conduit 112 that leads from the upper end of the cylinder to a port 113 in the casing of the valve 81. The port 113 communicates with an opening 114 extending longitudinally through the valve piston 82 and having communication, in the position shown, with a port 115 in the valve casing. From the port 115, a conduit 116 leads to a port 117 of a relay valve 118 provided with a spring urged plunger 119, a groove 120 in which establishes communication from the port 117 to an exhaust port 121 that is open to the atmosphere.

When the clutch actuating piston 107 arrives at its upper position, it uncovers a port 124 in the wall of the cylinder 106, as shown in Fig. 20, thereby permitting the hydraulic fluid flowing into the cylinder through the conduit 105 to escape into a conduit 125. The conduit 125 leads to a port 126 in the clutch controlling valve 81 which communicates through a groove 127 in the valve piston 82 with a port 128 that is connected to the lubricating system of the machine, the arrangement being such that after the clutch 35 has been shifted to engaged position, the oil under pressure from the pump 70 flows freely through the control system into the lubricating system.

If now either of the clutch controlling levers 83 or 88 is moved to position B, indicated in full lines in Figs. 18 and 19, the clutch controlling valve piston 82 is moved to a position causing disengagement of the main clutch 35 and engagement of a brake 130 on the main driving shaft 36, for stopping rotation of the transmission mechanism. As shown in Fig. 19, the clutch controlling levers are retained in the position to which they are shifted, by means of a spring urged plunger 131 which engages either of two notches or detents in the arm 85 on the control shaft 84 in manner to retain the valve plunger 82 in either the clutch engaging or the brake engaging position. With the valve plunger 82 in position B, the pressure port 80 is connected, by means of the groove 103, with the port 113 through which the pressure fluid then flows into the conduit 112 leading to the upper end of the cylinder 106 to exert pressure on the piston 107 in direction to move it downward. As the piston 107 moves downward, the fluid in the lower end of the cylinder escapes through the conduit 105 to the port 104 which then communicates through a groove 133 in the piston 82 with the port 115, from which the conduit 116 leads to the relay valve 118 and the open atmospheric port 121. When the piston 107 arrives at its lower position, it uncovers a port 134 in the wall of the cylinder 106 that communicates through a conduit 135 with the conduit 125 leading to the port 126 in the valve 81 which has connection through the valve groove 127 with the port 128 leading to the lubrication system as previously explained.

In the event that it should become necessary to stop the machine suddenly, as in an emergency for example, the brake may be engaged more firmly by moving either of the clutch controlling levers to a third position, C, indicated in dotted lines. This causes further movement of the valve piston 82 to the left, from the position shown in Fig. 20, a sufficient distance to move the groove 127 out of register with the port 126, thereby cutting off communication with the lubricating system and permitting the full pressure of the hydraulic system to be exerted upon the piston 107 for engaging the brake firmly. The maximum pressure which may be exerted in the hydraulic system is limited by a relief valve 136 that is connected to the conduit 73 leading from the pump 70 and that may be adjusted to establish a predetermined maximum pressure for the system. Any liquid which may be trapped in the left end of the valve 81 when the plunger 82 is moved to the left, escapes through an axial opening 137 in the plunger which then communicates with a port 138 in the side of the valve casing that is open to the atmosphere.

As appears in Figs. 3 and 20, the clutch actuating piston rod 108 is provided with a detent roller 139 that cooperates with a spring pressed detent plunger 140 to retain the clutch shifting mechanism in either the clutch engaging or the brake engaging position. Referring now to Fig. 3, the clutch shifting collar 110 which is engaged by the bell crank 109, is fixed on a clutch and brake shifting rod 141 that is disposed concentric with and is movable endwise through the hollow main driving shaft 36, the rod being associated at its outer end with a toggle mechanism 142 for actuating the clutch 35.

As best shown in Fig. 4, the toggle mechanism 142 comprises a plurality of arms 143 pivotally mounted on a carrier ring 144 that is threaded on the hub of the clutch 35 with the arms in position to engage and exert clamping pressure upon an axially movable friction element 145 of the clutch. The clamping relationship between the arms 143 and the clutch member 145 may be adjusted by turning the ring 144 on the threaded hub, a spring pressed retaining pin 146 being provided for retaining the ring in its adjusted position. Each of the actuating arms 143 is pivotally connected at its outer end to one end of a link 147 that is in turn pivotally connected at its other end to an actuating member 148 mounted on the outer end of the actuating rod 141. With the rod 141 in its left or inner position, as shown in Fig. 4, the toggles constituted by the arms 143, the links 147 and the member 148, are in broken position, thereby releasing the arms 143 from clamping engagement with the clutch member 145. When the clutch actuating rod 141 is moved to the right by movement of the actuating piston 107 to the top of the cylinder 106, the member 148 is moved to the position shown in Fig. 3. This moves the toggles past their center positions and causes the arms 143 to clamp the clutch member 145 for engaging the clutch, the clamping force then tending to move the rod 141 further to the right. At this point, abutments on the ends of the links 147 engage the edge of the member 148 to lock the toggles, thereby preventing further movement of the rod 141 and releasing the bell crank 109 from the necessity of exerting force upon the collar 110. The piston 107 now being in contact with the top of the cylinder 106, the collar 110 is relieved from pressure and is free to turn with the shaft 36.

As shown in the drawings, the actuating rod 141 has threaded engagement with the actuating member 148, the threads on the rod being of the same pitch as those on the hub of the clutch that engage the carrier ring 144. By this arrangement, the actuating member 148 is caused to progress along the rod 141 an amount equal to that which the carrier ring 144 progresses along the hub of the clutch when the toggle mechanism is turned for adjusting the clutch. Accordingly, the relationship between the actuating member 148 and the arms 143 of the toggle mechanism 142 remains the same regardless of adjusting movement of the toggle mechanism relative to the clutch friction element 145. Since movement of the clutch actuating mechanism in direction to engage the clutch is limited by abutment of the piston 107 with the top of the cylinder 106, this arrangement for retaining fixed relationship in the actuating linkage is of especial importance.

If now a range changing shifting movement, for example, is to be effected, the shifting knob 52 on the sliding head is first moved forward in unlatching movement to disengage the lugs 57 from the locking holes in the spindle head 27. This causes the circular rack 60 on the range changing shaft 51 to turn the pinion 61 on the lower end of the extensible shaft 62, thereby moving the valve piston 64 to the right from the position seen in Fig. 20. A cannelure 150 in the valve piston 64 with which the pressure port 74 communicates, is thereby moved out of communication with the valve port 75 and into communication with a port 151, whereupon pressure liquid flowing from the pump 70 through the conduit 73 and the port 74 may pass along the cannelure 150 to the port 151 and thence through a conduit 152 to a port 153 of the valve 66 associated with the speed changer. The port 153 communicates through a cannelure 154 of a valve plunger 155 in the valve 66, with a port 156 from which a conduit 157 leads to a pressure cylinder 158 within the left end of the clutch controlling valve 81. The liquid in the cylinder 158 exerts pressure on the valve piston 82 in direction to move it to the right, the actuating slot 87 in the piston being of such length as to provide clearance or lost motion permitting movement of the piston to the right beyond the position it assumes when the clutch controlling lever is moved to position A. With the valve plunger 82 in its right position, the longitudinal opening 114 therein is moved out of communication with the port 115 in order to prevent the escape of liquid from the upper end of the clutch actuating cylinder 106 through the conduit 112, the ports 113 and 115, and the conduit 116 to the exhaust port 121.

From the pressure cylinder 158, at the left end of the clutch controlling valve 81, a pressure conduit 160 continues to a pressure cylinder 161 in the lower end of the relay valve 118, the pressure therein causing the plunger 119 thereof to be moved upwardly against the resistance of a spring 162. This results in uncovering a port 163 through which the pressure fluid flows from the cylinder 161 into a conduit 164 leading to an inlet opening 165 in the clutch actuating cylinder 106 which communicates with a cannelure 166 in the piston rod 108. From the cannelure 166, the pressure fluid flows along an axially disposed passageway 167 through the piston rod 108 into the middle of the piston 107, and thence through a transverse passageway 168 into a cylindrical valve chamber 169 formed longitudinally in the piston 107 parallel with and at one side of the piston rod 108. Within the valve chamber 169 there is arranged a stationary valve plunger 170 adapted to register with and close the transverse passageway 168 when the piston 107 is positioned at a predetermined neutral point in its path of travel, the valve plunger 170 being provided with extending stems disposed to engage the respective ends of the cylinder 106 to retain the plunger in predetermined position relative to the cylinder.

With the machine in operation, the main clutch being engaged and the clutch actuating piston 107 being in its upper position as shown, when a gear shifting operation is initiated, pressure fluid admitted through the conduit 164, flows from the transverse passageway 168 through the valve chamber 169 to the upper end of the cylinder 106 thereby exerting pressure to move the piston 107 downward. Since the port 75 in the valve 63 is now closed, no pressure is applied to the lower side of the piston 107 through the conduits 76, 79 and 105, nor can any liquid escape by this path. Likewise, no liquid can escape from the top of the cylinder through the conduit 112 by reason of the port 115 being closed. Liquid remaining in the lower end of the cylinder 106 then escapes through a port 173 in the cylinder wall which communicates with a conduit 174 leading to a port 175 in the relay valve 118. With the relay valve piston 119 in its upper position, the port 175 is in communication with the groove 120 through which the liquid may exhaust into the atmosphere by way of the exhaust port 121. As the clutch actuating piston 107 descends within the cylinder 106, it has a tendency to travel beyond its predetermined neutral position. However, in doing so it will close the port 173 thereby trapping liquid in the lower end of the cylinder and preventing further downward movement of the piston to the position in which the brake would be engaged.

When the piston 107 arrives at the point at which the port 173 is closed, the valve plunger 170 registers with the transverse passageway 168, thereby stopping the flow of pressure fluid through the valve chamber 169 into the upper end of the cylinder 106 and the piston 107 comes to rest at a position in which the main clutch 35 is disengaged, but the brake 130 has not yet been engaged. At this point the top of the piston partially exposes the upper port 134 in the cylinder wall thereby permitting the escape of any excess liquid which may enter the upper end of the cylinder, into the conduits 135 and 125 leading to the lubrication system.

When the piston 107 is thus retained in its neutral position, a port 178 extending from the transverse passageway 168 through the side of the piston, registers with a port 179 in the cylinder wall from which a conduit 180 leads to a port 181 in the relay valve 118. With the relay valve plunger 119 in its upper position, a groove 182 therein effects communication between the port 181 and the port 117 from which the conduit 116 leads to a conduit 183 that communicates with an actuating cylinder 184 for the slow speed driving mechanism. The port 115 in the valve casing 81 at the end of the conduit 116 is closed, preventing the escape of pressure. Pressure in the cylinder 184 causes the slow speed driving mechanism to be engaged for turning the gearing slowly to facilitate gear shifting. As is clear from the foregoing explanation, pressure is applied through the conduit 183 to the cylinder 184 only after the piston 107 has moved to its neutral position in which both the clutch and the brake are disengaged. Pressure in the cylinder 184 then acts upon a piston 185 therein to force it outwardly against one end of a pivoted lever arm 186.

As appears in Fig. 3, the cylinder 184 is formed in a supporting bracket 187 to which the lever arm 186 is pivotally connected and that also carries a slow speed driving mechanism designated generally 188. The slow speed driving mechanism 188 is generally similar to the mechanism disclosed in the previously mentioned Patent No. 2,345,171, and comprises essentially a gyratory speed reduction gear mechanism 189 arranged to be driven by a gear train including a gear wheel 190 fixed on a sleeve 191 that is connected with and is continuously driven by the main driving pulley 31. A friction clutch 192 is arranged to effect driving connection between the speed reducing mechanism 189 and a gear train including a gear wheel 193 fixed on the main driving shaft 36 of the machine.

When a shifting operation is initiated by unlatching movement of either the range changing knob 52 or the speed changing lever 67 and both the main clutch 35 and the brake 130 are moved to disengaged position to release the main driving shaft 36 for free rotation, pressure applied to the cylinder 184 moves the piston 185 outwardly against the lever arm 186, causing it to pivot in manner to exert force inwardly upon a clutch actuating member 195 for engaging the clutch 192 to couple the slow speed driving mechanism 188 to the main shaft 36. Since the slow speed driving mechanism 188, the pivoted lever 186, and the cylinder 184 are all associteed with the bracket 187 in manner to constitute a unit, a fixed relationship is maintained between the actuating cylinder 184 and the clutch actuating element 195 regardless of any variations which may occur in the relationship between various major elements of the machine in assembling the mechanism in the column 20.

With the clutch actuating piston 107 in its neutral position, the detent roller 139 is disposed relative to the detent plunger 140, in such position that the plunger exerts force in direction tending to move the piston downward to brake engaging position, this force being resisted by the fluid trapped in the lower part of the cylinder. After the range changing operation has been completed, the shifting knob 52 is returned to latched position, thereby returning the valve plunger 64 to the position shown in Fig. 20. This results in interrupting the connection between the presusre port 74 and the port 151 from which the conduit 152 leads through connecting passages to the pressure cylinder 158 in the valve 81 and the pressure cylinder 161 in the valve 118, the port 151 being then placed in communication with a port 197 that is open to the atmosphere. Pressure in the valve operating cylinders 158 and 161 is thereby relieved, the valve plunger 82 remaining in its extreme right position, being retained therein by means of a light detent mechanism 198, and the valve plunger 119 of the relay valve 118, being returned by the spring 162 to its lower position shown in Fig. 20. This results in closing the connection from the port 173 in the cylinder 106 through the conduit 174 and port 175 to the atmospheric port 121, and also in closing the connection from the central slow speed port 179 through the conduit 180 and port 181 to the port 117 of the relay valve 118 from which the conduits 116 and 183 lead to the slow speed clutch actuating cylinder 184. The port 117 is then connected through the groove 120 with the atmospheric port 121 for relieving pressure from the cylinder 184, thereby permitting the slow speed clutch 192 to return to disengaged position.

With the range change valve plunger 64 in the latched position as shown in Fig. 20, the pressure port 74 is again connected with the port 75 from which the pressure fluid flows through conduit 76, ports 77 and 78 and conduit 79 to the pressure port 80 in the valve 81. With the valve plunger 82 remaining in the right position, the port 80 has communication with the port 113 thereby permitting the pressure flow to flow through the conduit 112 to the upper end of the cylinder 106 to prevent the piston 107 from moving upward into clutch engaging position. This prevents the main driving clutch 35 from being reengaged unintentionally at the conclusion of a gear changing operation, restarting of the machine being possible only under positive control of the operator through actuation of either of the clutch controlling levers 83 or 88.

When it is desired to restart the machine, one of the clutch controlling levers is first moved to the stop position B to withdraw the valve plunger 82 from its right position. The lever is then returned to start position A, thus taking up the lost motion provided by the elongated actuating slot 87 and positioning the valve plunger 82 in the clutch engaging position A. This completes the circuit from the pressure port 80 through the port 104 and conduit 105 to the lower end of the cylinder 106 for moving the piston 107 upward to clutch engaging position, as previously explained.

When it is desired to effect a speed changing operation by means of the speed changing lever 67, a latching handle 201 on this lever is drawn outward to unlatch the lever for rotation. The unlatching movement of the handle 201 causes the valve plunger 155 of the valve 66 to be moved to the right, from the position shown in Fig. 20, to disconnect the pressure port 77 from the port 78 from which the conduit 79 leads to the pressure port 80 of the valve 81, and to connect the pressure port 77 to the port 156 from which the conduit 157 leads to the actuating cylinder 158 of the valve 81. This moves the valve plunger 82 to the right for effecting automatic disengagement of the main clutch 35 and engagement of the slow speed driving clutch 192, as previously explained, the entire cycle of operations being similar to that initiated by unlatching movement of the range changing control knob 52.

In the event that the gears are shifted to change the setting of either the speed changing mechanism or the range changing mechanism when the spindle clutch is disengaged and the clutch controlling valve plunger 82 is in stop position (position B), it is preferable that the valve plunger 82 remain in this position in order to avoid unnecessary movement of the clutch controlling levers. Accordingly, the valve plunger 82 is so arranged that when it is in the left or stop position, it closes the connection between the conduit 157 and the pressure cylinder 158. Consequently, when either the range changing valve plunger 64 or the speed changing valve plunger 155 is moved in connection with a speed changing operation, the pressure fluid admitted from the pump 70 into the conduit 157 continues past the valve 81 into the conduit 160 without moving the valve plunger 82. Pressure in the conduit 160 then flows into the lower end of the relay valve 118 and moves the plunger 119 thereof upward as previously explained. This closes the connection between the conduit 116 and the exhaust port 121 and permits the pressure fluid to flow through port 163 into conduit 164 and through the inlet opening 165 into the cannelure 166 and passageway 167 in the piston rod 108. From the passageway 167, the fluid flows through the transverse passageway 168 into the valve chamber 169 which then communicates with the lower end of the cylinder 106 since the piston 107 is now in the lower or brake engaging position. The pressure fluid in the lower part of the cylinder 106 then causes the piston 107 to move upward to the neutral or central position. As the piston 107 moves upward, fluid in the upper part of the cylinder 106 escapes through the port 134, the conduits 135 and 125, and the ports 126 and 128 into the lubrication system. When the neutral position is reached, the valve plunger 170 closes the transverse passageway 168 as previously explained, and the piston closes the port 134 to trap the remaining fluid in the upper end of the cylinder to prevent further upward movement of the piston.

Pressure fluid then flows from the passageway 168 through the port 178 and the registering port 179 into the conduit 180 leading to the relay valve 118. The relay valve plunger 119 being in its upper position, the conduit 180 communicates through ports 181 and 117 with the conduit 116 that connects with the conduit 183 leading to the slow speed drive mechanism actuating cylinder 184 as previously explained. However in this instance the conduit 116 is already connected through the port 115 of valve 81, groove 133 and port 104, with the conduit 105 leading directly to the lower end of the cylinder 106 and pressure from this source operates to engage the mechanism for turning the gearing slowly as soon as the connection with the exhaust port 121 is closed by upward movement of the relay plunger 119.

Since during the time that the piston 107 is in neutral position for gear shifting, the detent roller 139 is in a position in which the detent plunger 140 exerts force upon it to move the piston rod 108 downward to brake engaging position, the brake will be reengaged automatically after the gear changing operation is completed. When the actuating valve plunger 64 or 155 is returned to latched position after a gear changing operation, pressure in the conduit 157 is relieved through the exhaust port 197 of valve 63. This permits relay valve plunger 119 to return to its lower position thereby establishing communication between port 117 and exhaust port 121. Fluid pressure in the slow speed cylinder 184 then escapes through the exhaust port 121 and the slow speed drive disengages. Likewise, fluid in the lower part of the cylinder 106 escapes through the conduit 105 and ports 104 and 115 into conduit 116 and thence through the exhaust port 121, thereby permitting the piston 107 to move downward and engage the brake, pressure being admitted meanwhile to the upper part of the cylinder through the valves 63 and 66, conduit 79, pressure port 80 and the conduit 112.

Figure 21:
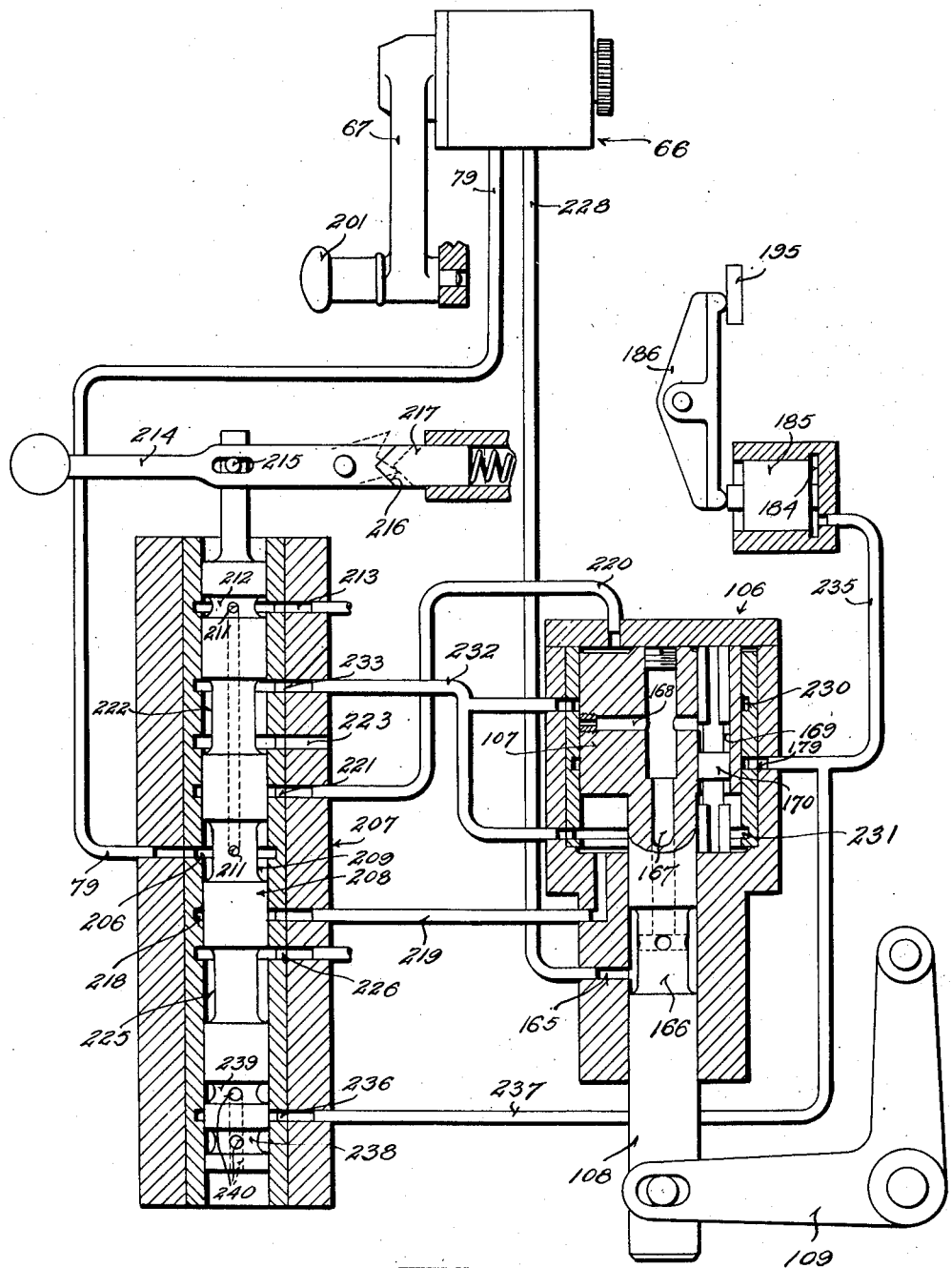
Fig. 21 is a schematic diagram of a modified form of the hydraulic control system.

In a modified form of the hydraulic control system, shown in Fig. 21, the pressure conduit 79 leading from the speed changer actuated valve 66 is connected to a central pressure port 206 in a modified clutch controlling valve 207, the valve being provided with a valve plunger 208 that may be moved to clutch engaging or to brake engaging positions at opposite sides, respectively, of the neutral position shown in the drawing. As shown, the valve plunger 208 is provided with a medial groove 209 disposed to have communication with the pressure port 206 in any position assumed by the plunger. With the plunger 208 in the neutral position, pressure fluid entering the port 206 from the conduit 79 flows through a longitudinal bore 211 in the plunger to a groove 212 thereon which communicates with a port 213 constituting a connection with the lubrication system, the arrangement being such that when the valve plunger is in neutral position, the oil under pressure flows directly through the valve into the lubrication system.

For actuating the clutch controlling valve plunger 208, there is provided a pivotally mounted clutch controlling lever 214 which may be taken as representing either of the clutch levers 83 and 88 that were previously described in connection with the machine structure. In this modification, the controlling lever is connected to actuate the valve plunger without lost motion, a pin 215 fixed in the plunger cooperating with a closely fitting slot in the lever for this purpose. Furthermore, the two detent notches utilized in connection with the previously described clutch lever system are in this instance replaced by a single detent notch that functions to urge the valve plunger 208 to its neutral position at all times. As shown, the single detent notch 216 is formed in an overhanging end of the control lever 214 and cooperates with a spring pressed detent plunger 217 disposed to urge the lever to central position.

If now the clutch controlling lever 214, is actuated to move the valve plunger 208 downward to the clutch engaging position, the groove 212 is moved out of register with the lubrication port 213, thereby preventing escape of the pressure fluid into the lubricating system. At the same time, the groove 209 communicating with the pressure port 206 is moved into communication with a port 218 from which a conduit 219 leads to the lower end of the clutch actuating cylinder 106, the fluid pressure being exerted on the lower side of the piston 107 to move it upward to clutch engaging position. Liquid in the upper end of the cylinder 106 is forced out through a conduit 220 that leads to a port 221 of the valve 207 which then has communication through a groove 222 in the plunger with a port 223 that is open to the atmosphere.

After the clutch has been engaged, the actuating lever 214 may be released, permitting the spring pressed detent plunger 217 to act upon the notch 216 in manner to return the valve plunger 208 to its central position. This results in re-establishing connection from the pressure port 206 through the groove 209, the bore 211 and the groove 212 with the lubrication port 213, and in closing both the port 218 connected with the lower end of the cylinder 106 and the port 221 connected with the upper end of the cylinder, thereby preventing the flow of liquid into or out of either end of the cylinder and locking the piston 107 in clutch engaging position.

If now the clutch controlling lever 214 is moved to the brake engaging position, thereby moving the valve plunger 208 upward, the groove 212 is again moved out of communication with the lubrication port 213 to prevent escape of the liquid, and the pressure groove 209 is then moved into communication with the port 221 through which the pressure fluid flows into the conduit 220 and thence into the upper end of the cylinder 106. At the same time, a groove 225 in the valve plunger 208 establishes communication from the port 218 to an atmospheric port 226 for permitting the escape of liquid from the lower end of the cylinder 106 by way of the conduit 219. Pressure exerted by the fluid entering the upper end of the cylinder 106, causes the piston 107 to be moved downward to brake engaging position, whereupon the hand lever 214 may again be released to return to neutral position, thereby reestablishing communication from the pressure port 206 to the lubrication port 213 as before explained, and closing the ports 218 and 221 communicating with the ends of the cylinder 106 to lock the piston 107 in the brake engaging position.

If it is desired to effect a speed changing operation, for example by actuating the lever 67 to adjust the speed changing mechanism 37 either with the clutch actuating piston 107 in brake engaging position or with the clutch engaged and the machine operating, the latching handle 201 is first withdrawn thereby moving the valve plunger 155 of the valve 66 to the right. This disconnects the pressure port 77 of the valve 66 from the port 78 from which the conduit 79 leads to the pressure port 206 of the clutch actuating valve 207, the pressure port 77 being then placed in communication with the port 156 from which a conduit 228 leads to the port 165 of the clutch actuating cylinder 106. From the port 165, the pressure fluid flows through the cannelure 166, the longitudinal passageway 167, and the transverse passageway 168 into the valve chamber 169 from which it flows, as previously explained, into the one or the other end of the cylinder 106 for moving the piston 107 from either the brake engaging or the clutch engaging position to a neutral position in which the valve plunger 170 closes the transverse opening 168.

With the piston 107 in the neutral or central position in which both the clutch and the brake are disengaged, the upper and lower edges of the piston partially uncover ports 230 and 231 formed in the wall of the cylinder 106, both of which communicate with a conduit 232 that leads to a port 233 in the valve 207 which has communication, when the valve piston 208 is in its neutral position, through the groove 222 with the atmospheric port 223. By this arrangement, any pressure which may be developed in either end of the cylinder 106 is permitted to escape to atmosphere without moving the piston 107 from its neutral position.

As previously explained, when the piston 107 is in its neutral position, the radial port 178 therein establishes communication from the transverse passageway 168 to the port 179 in the wall of the cylinder 106. In the present instance, a conduit 235 effects a direct connection from the port 179 to the cylinder 184 for exerting pressure therein upon the piston 185 to engage the clutch 192 of the slow speed drive mechanism, the arrangement being such that the slow speed clutch 192 can not be engaged until both the main clutch 35 and the brake 130 are disengaged by movement of the piston 107 to its neutral position. To prevent the slow speed drive mechanism from continuing to operate when either the main clutch 35 or the brake 130 is engaged by actuation of the manually operated clutch controlling lever 214, the valve 207 is provided with an escapement port 236. As shown, the port 236 is connected by a conduit 237 with the conduit 235 leading to the cylinder 184 and is so disposed that it is closed when the valve plunger 208 is in neutral position. When the clutch lever 214 is moved to either the clutch engaging or the brake engaging position, a groove 238 or a groove 239 in the plunger will be moved into register with the port 236. This permits the escape of pressure fluid from the slow speed drive engaging cylinder 184, through the conduit 235, the conduit 237 and the one or the other of the grooves 238 and 239, into a longitudinal passageway 240 extending inward from the end of the plunger, the passageway having communication with both grooves and being open to the atmosphere.

In a milling machine of the horizontal spindle type, such as is illustrated in Fig. 10, the range changing mechanism is disposed adjacent to the speed changing mechanism and is controlled from the left side of the column. As in the vertical machine, the range changer is provided with a control valve that is functionally similar to the control valve 63 shown in Fig. 20, and that is associated with the speed changer actuated valve 66, in the manner set forth in the previously mentioned Patent No. 2,345,171. As appears in Figs. 10 and 11, the range changing mechanism for the horizontal type machine includes a large gear wheel 245 and a pinion 246 both rigidly fixed on a horizontally disposed spindle 247 in spaced arrangement. Cooperating with the spindle gear and pinion is a sliding gear couplet 248 constituted by a large gear wheel 249 and a pinion 250 adapted to be meshed respectively with the pinion 246 and the large gear wheel 245.

The mechanism for shifting the range change couplet 248 includes a shifting fork 252 adapted to engage a groove 253 in the hub of the gear 249 and arranged to be moved by a crank arm 254 that is operatively connected by gearing 255 for actuation by a range changing lever 256 disposed on the side of the machine above the speed changing lever 67. The range changing lever 256 is mounted to be moved through a half revolution, from the horizontal position shown in full lines in Fig. 10 to the horizontal position shown in dotted lines, a latching handle 258 being provided for latching the lever in either position. The latching handle functions upon unlatching movement thereof to shift the range changer actuated control valve 63, as in the case of unlatching movement of the range changing knob 52.

Associated with and operated by the speed changing lever 67 is a speed indicating dial 260 presenting two series of speed indicia corresponding with the two ranges of operation, the indicia of the two series being arranged alternately and those of one series being displaced angularly relative to those of the other series. The range changing lever 256 carries an indicator 261 that is disposed, when the lever 256 is in the position shown in full lines, to cooperate with one series of the indicia on the dial 260 for indicating the several spindle speeds obtainable by actuation of the speed changing lever 67 with the range changing lever 256 in the low range position. When the range changing lever 256 is moved to the high range position, shown in dotted lines, a second indicator 262 on the other side of the lever is positioned to cooperate with the other series of indicia for indicating the speeds obtainable in the high speed range, the angular displacement between the two series of indicia being such as to compensate for the displacement between the indicators 261 and 262 in their respective operating positions. In the machine of vertical spindle type, the speed indicating dial 260, shown in Fig. 1, has associated with it a pair of stationary indicators 263 and 264 corresponding to the positions assumed by the indicators 261 and 262 of the horizontal machine and bearing characters corresponding to the characters on the front of the spindle head 27 for indicating the fast and slow positions of the range changing knob 52.

The range changing couplet 248 in the horizontal machine is constituted by separately formed gear and pinion elements, the pinion having formed integrally with it an internally and externally splined sleeve 266 arranged for sliding movement along a splined driving shaft 267 and adapted to receive the gear wheel 249. As appears in Figs. 12 and 13, the sleeve 266 presents a series of inwardly projecting lands 268 for slidably engaging the grooves in the splined shaft 267 and is provided with outwardly extending lands 269 which project into and engage complementary splined grooves on the interior of the gear wheel 249. It is desirable that the pinion 250 be made as small as possible and in order that the teeth of the pinion may be finished by grinding, the sleeve 266 is made smaller than the root diameter of the pinion with its walls formed as thin as possible. This is accomplished in this instance by disposing the internal spline lands 268 in radial alignment with the external spline lands 269 in such manner that each pair of internal and external lands constitutes in effect an independent key between the shaft 267 and the gear wheel 249. Consequently, the connecting portions of the sleeve 266 between the lands, are subjected to very little stress and may be made very thin.

Power for effecting actuation of the work supporting members is transmitted to transmission and control mechanism within the vertically movable knee 23 of the machine (as shown in Fig. 2) by means of a pair of vertically disposed splined shafts 271 and 272 that have sliding engagement with the mechanism in the knee and that are driven, respectively, at feed rate and at rapid traverse rate. The feed rate shaft 271 is arranged to be driven only when the main clutch 35 is engaged, in order that the work feeding mechanism may not be operated inadvertently when the tool carrying spindle is not rotating. For this purpose, the driving power is derived from the main shaft 36 (as shown in Fig. 3) by means of the gear wheel 193 fixed thereon and that meshes with a gear wheel 273 mounted on a stub shaft 274 which carries a bevel pinion 275 meshing with a similar bevel pinion 276. The pinion 276 is splined on a shaft 277 which is connected by means not shown in the drawings, to drive a bevel pinion 278, shown in Fig. 2, that meshes with a complementary bevel pinion 279 on a vertically disposed sleeve 280. The sleeve 280 is provided at its upper end with a spur gear 281 that meshes with a spur gear 282 fixed on a sleeve 283 which is operatively connected to the upper end of the vertical shaft 271 for driving it.

Since it is desirable that the work supporting structure may be moved at rapid traverse rate regardless of whether or not the spindle is operating, power for actuating the vertical rapid traverse driving shaft 272 is derived from the gear wheel 190, Fig. 3, which is fixed on the sleeve 191 permanently connected to the main driving pulley 31, whereby the gear 190 is driven whenever the motor 30 is operating. From the gear 190, power is transmitted through a gear wheel 285 and a gear wheel 286 constituting the driving train for the slow speed mechanism 188, and by means of other gearing (not shown in the drawings), to a bevel pinion 287, shown in Fig. 2, which meshes with a complementary pinion 288 on a vertically disposed sleeve 289. The sleeve 289 is provided at its lower end with a spur gear 290 disposed adjacent to but supported independently from the feed rate gear 281. The gear 290 meshes with an idler gear 291 that is disposed adjacent to the feed shaft driving gear 282, the gear 291 being rotatably mounted on the sleeve 283 to which the feed gear 282 is fixed. From the idler gear 291, the rapid transverse power is transmitted to a meshing gear 292 fixed on the upper end of the vertical rapid traverse shaft 272 for driving it continuously regardless of whether or not the feed shaft 271 is operating.

From the transmission and control mechanism in the knee 23, power for actuating the work supporting table 25 is transmitted to a pair of bevel clutch gears 295 and 296 shown in Fig. 14 and arranged to be driven in opposite directions respectively and mounted for free rotation on a sleeve 297 journalled in the saddle 24. The sleeve 297 has splined connection with a table driving screw 298 that is rotatably mounted in the ends of the table 25 and has cooperative threaded engagement with a nut structure 299 mounted in the saddle 24, the arrangement being such that endwise feeding movement of the table is effected by rotary movement of the screw. Between the oppositely rotating clutch gears 295 and 296, there is positioned a clutch spool 301 that has sliding splined connection with the sleeve 297 and that may be moved into clutching engagement with either clutch gear to couple it to the sleeve for driving the table in either direction selectively. The clutch spool 301 may be moved along the sleeve 297 by means of a slidably mounted shifting fork 302 that is engaged by one arm of a bell crank 303 the other arm of which engages one end of an axially slidable control rod 304. The control rod 304 is engaged at its other or forward end for actuation, by a table controlling lever 305 pivotally mounted on the front of the saddle 24 and provided with a detent mechanism 306 for retaining it and the shifting clutch spool either in their neutral position or in either of their driving positions. The control rod 304 is further provided with rack teeth 307 that are engaged by a pinion 308 slidably splined on a control shaft 309 that is rotatably mounted in the ends of the table 25. At its left end, the shaft 309 is provided with a pinion 310 arranged to be actuated by a pinion 311 associated with another table controlling lever 312 which is pivotally mounted on the left end of the table and is accessible from the rear controlling position.

The table driving nut structure 299 mounted in the saddle 24 is made adjustable for the purpose of maintaining close engagement with the table driving screw 298 to adapt the machine to climb cutting operations. As best shown in Fig. 16, the nut structure comprises two parts, one of which is a fixed nut element 315 that has screw threaded engagement with a receiving bore 316 in the saddle 24 and that is locked rigidly in the saddle by a locking screw 317. The other nut element is in the form of a cylindrical member 318 that is rotatably received in the bore 316 and that is normally positioned to abut the inner end of the stationary nut element 315. As best shown in Figs. 16 and 17, the outer end of the adjustable nut element 318 is provided with circumferentially arranged serrations 319 adapted to cooperate with complementary internal serrations 320 in a nut adjusting yoke 321.

In adjusting the nut mechanism 299 to take up lost motion between it and the screw 298, the adjustable nut element 318 is turned upon the screw 298 to bring it into abutting relationship with the fixed nut element 315. After a coarse adjustment has been effected in this manner, the nut adjusting yoke 321 is fitted on the serrated end of the nut element 318 in the position shown in Fig. 17. A pair of lugs 322 and 323 projecting at opposite sides of the yoke 321 are then engaged by adjusting screws 324 and 325 threaded in the saddle structure 24. By turning the adjusting screws 324 and 325, the adjustable nut element 318 may be turned on the screw 298 under positive control for effecting close adjustment of the degree of engagement between the nut mechanism 299 and the screw 298. With the nut structure thus closely adjusted, the left faces of the screw threads in the adjustable nut element 318 are brought into contact with the right faces of the threads on the screw 298, as shown in Fig. 15, while the right faces of the threads in the fixed nut element 315 are caused to engage the left faces of the threads of the screw.

By this arrangement, the fixed nut element 315 exerts force on the screw in direction to prevent movement thereof to the left while the adjustable nut element 318 exerts force on the screw in direction to prevent movement thereof to the right, the adjustable element transmitting force from the screw to the fixed element through the abutting relationship therebetween.

Compensation for wear may be effected and any desired degree of tightness may be established readily by first setting the adjustable nut element approximately through adjusting the serrated connection between it and the yoke 321, and then carefully turning the yoke by loosening one adjusting screw and tightening the other, the two screws serving to lock the nut element in adjusted position.

Power for actuating the sliding head 27 to effect vertical feeding movement of the spindle 28 is also derived from the transmission mechanism in the knee 23, a horizontal shaft 326 in the knee being connected by bevel gear 327 with a telescoping vertical shaft 328 that extends upward along the right side of the column 20, as shown in Fig. 2. The upper end of the shaft 328 is operatively connected by bevel gearing 329 with a horizontal shaft 330 extending forwardly along the side of the column and provided at its forward end with a bevel pinion 331. The bevel pinion 331 meshes with a pair of oppositely rotating bevel clutch gears 332 and 333 that are rotatably mounted concentric with a vertically disposed nut actuating shaft 334. Either clutch gear may be coupled to the shaft 334 for turning it in either direction selectively, by means of a clutch spool 335 slidably splined on the shaft between the gears. As best shown in Fig. 7 the vertical shaft 334 is provided at its upper end with a spur gear 336 that meshes with a horizontally disposed idler gear 337 which meshes in turn with a gear 338 formed on a rotatable nut 339 that is journalled in the column structure by means of anti-friction bearings 340. As shown, the rotatable nut 339 has threaded engagement with a vertical disposed elevating screw 341 that is connected at its lower end to the sliding head structure 27, whereby the head may be raised or lowered upon rotation of the nut 339 in the one or the other direction.

For controlling the direction and the extent of power movement of the sliding head 27, a hand lever 343 is pivotally mounted on the right side of the column adjacent to the head, as shown in Fig. 2. The hand lever is operatively connected by linkage 344, shown in Fig. 9, with a vertically movable shifting fork 345 which engages the reversing clutch spool 335, a spring pressed detent mechanism 346 being provided for retaining the lever 343 and the clutch spool 335 either in neutral position or in up or down feeding position. A pair of tripping dogs, such as the dog 348, may be adjustably mounted on the sliding head 27 for engagement with trip posts 349 and 350 which connect with the linkage 344 and operate to disengage the clutch spool 335 to stop the head at either of two predetermined limiting positions in its path of travel. A multiple position stop mechanism 351 is also provided on the sliding head 27 in position to cooperate with a trip rod 352 for stopping the head at a selected one of a plurality of predetermined positions in the course of downward feeding movement of the spindle 28. For effecting manual vertical movement of the sliding head 27, a hand wheel 353 is provided on the forward end of a bracket 354 projecting from the column, the hand wheel being connected by a shaft 355 with a bevel pinion 356 which meshes with a similar bevel pinion 357 on the lower end of the vertical shaft 334 for turning it to effect actuation of the head elevating nut 339.

From the foregoing detailed description of the illustrative structures set forth herein to disclose the principles of the present invention, it is apparent that there has been provided an improved power transmitting and controlling mechanism for actuating the movable parts of a machine tool, including improved elements of machine structure especially adapted for use in machine tools.

Although the several exemplary embodiments of the invention have been described in considerable detail for the purpose of fully disclosing operative apparatus incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing description setting forth illustrative embodying apparatus, we hereby claim as our invention:

1. In a milling machine of the vertical spindle type, a column, a spindle head movably mounted on said column, a tool spindle rotatably mounted in said head, means for driving said spindle including range changing shiftable gearing carried by said head, a manually actuatable shifting lever on said head connected to shift said range changing gearing, drive mechanism in said column operatively connected to drive said range changing gearing and including a disconnecting clutch and a slow speed drive mechanism, hydraulic control mechanism in said column for disengaging said clutch and engaging said slow speed drive mechanism prerequisite to a gear changing operation, and actuating linkage associated with said shifting lever on said movable head and operatively connected to said hydraulic control mechanism in said column in manner to actuate it for establishing said slow speed drive upon shifting movement of said lever.

2. In a milling machine of the vertical spindle type, a column, a spindle head slidably mounted on said column, a tool spindle rotatably mounted in said sliding head, transmission mechanism for driving said spindle including main driving means and auxiliary driving means mounted in said column, means to transmit power to said spindle including range changing mechanism carried by said sliding head, a shifting mechanism for said range changing mechanism including a member carried by said sliding head and arranged to be latched in positions corresponding to the positions of adjustment of said range changing mechanism, and control means operative in response to unlatching movement of said shifting member in said sliding head to disengage said main driving means and engage said auxiliary driving means in said column for facilitating said range changing adjustment.

3. In a milling machine of the vertical spindle sliding head type, a frame, a spindle head slidably mounted on said frame, a tool spindle rotatably mounted in said sliding head, a power transmission mechanism mounted in said frame and including speed changing apparatus, means for transmitting power from said speed changing apparatus to said tool spindle including range changing mechanism carried by said sliding head, means operative to turn said transmission mechanism slowly to facilitate adjustment thereof, means on said sliding head for adjusting said range changing mechanism, and control means associated with said range change adjusting means to render effective said transmission turning means in said frame during adjustment of said range changing mechanism.

4. In a milling machine having a frame carrying a sliding head, a tool spindle rotatably mounted in said sliding head, means for driving said spindle including a range changing mechanism mounted in said sliding head, apparatus in said frame for transmitting power to said range changing mechanism in said sliding head, a shifting member rotatably and slidably mounted in said sliding head, means responsive to sliding movement of said shifting member to control said apparatus in said frame for transmitting power to said range changing mechanism, and means responsive to rotation of said shifting member to shift said range changing mechanism.

5. In a machine tool, a frame, a movable supporting means carried by said frame, a transmission mechanism carried by said movable supporting means, a shifting lever carried by said movable supporting means and operative to adjust the transmission mechanism carried thereby, a power source in said frame operatively connected to drive said transmission mechanism, hydraulic control mechanism in said frame operative to control said power source, and mechanical linkage operatively connecting said shifting lever on said movable means with said hydraulic control mechanism in said frame.

6. In a range changing mechanism for a machine tool, a shiftable gear, power driven means for turning said gear, a controller for said power driven means, a range changing shifter including an axially and rotatably movable shaft, means for latching said shaft in predetermined positions of rotation, said means being releasable upon endwise movement of said shaft, a circular rack formed on said shaft and operative upon endwise movement thereof to actuate said controller for said power driven means, and means operative upon rotatable movement of said shaft to shift said range changing gear, whereby upon endwise unlatching movement of said shifter shaft said controller may be actuated by said circular rack to alter the mode of power rotation of said gear and upon rotatable movement of said unlatched shaft said gear may be shifted to change the range of operation of said machine tool.

7. In a machine tool control system, a speed changing mechanism, means driving said speed changing mechanism including a main clutch, manually operable means for adjusting said speed changing mechanism, means associated with said manual speed adjusting means and operative only to disengage said main clutch prior to a speed changing adjustment, means preventing reengagement of said main clutch by said manual speed adjusting means, and a separate manually operable clutch actuating lever wholly independent of said speed adjusting means arranged to effect reengagement of said clutch selectively subsequent to a speed changing adjustment.

8. In a machine tool, a rotatable element, means for driving said rotatable element including a speed changing mechanism and a range changing mechanism, a manually operable lever connected to adjust said speed changing mechanism, a dial associated with said speed changing lever, said dial presenting two series of speed indicia alternately arranged thereon and angularly displaced relative to each other, a second manually operable lever connected to adjust said range changing mechanism said lever being movable through substantially 180°, and a speed indicator mounted on said range changing lever, said speed indicator being movable into cooperating relationship with the one or the other of said series of indicia on said dial at angularly spaced positions thereon corresponding with the angular displacement of said two series of speed indicia, whereby the speed of operation of said rotatable element may be ascertained by reading said dial against said speed indicator in either position of adjustment of said range changing mechanism.

9. In a machine tool transmission mechanism, an indicating dial presenting speed indicia arranged in a circle thereon said indicia including two series each indicating progressively increasing speeds the indicia of said two series being arranged alternately in said circle with one series angularly displaced relative to the other, a range changing control lever associated with said indicating dial and operative to select the one or the other of said speed series for operation of said transmission mechanism, and an indicator carried by said range changing lever and disposed to register with said dial at either of two positions angularly spaced to correspond with the angular displacement of said indicia series and in accordance with the speed series established by said lever.

10. In a machine tool, means for transmitting power at variable rate, means for adjusting said power transmission means, an auxiliary slow speed driving means for turning said transmission means slowly to facilitate adjustment thereof, a clutch operative to connect said slow speed driving means to turn said transmission means, a supporting element disposed to support said clutch in operating position, a hydraulic actuating cylinder formed in said supporting element, a piston slidably fitted in said cylinder, means operatively connecting said piston to said clutch for actuating it, and a hydraulic control system associated with said hydraulic cylinder and operative to exert pressure therein for actuating said slow speed clutch in coordination with adjustment of said transmission means.

11. In a machine tool control system, a main driving clutch, means for controlling said clutch including a hydraulically actuated clutch operating mechanism, a source of hydraulic pressure for actuating said clutch operating mechanism, a manually operable control valve arranged to be moved in either direction from a neutral position and operative to admit fluid pressure from said source to said clutch operating mechanism for effecting corresponding movement of said clutch, means to retain said clutch in the position to which it is moved, and means urging said control valve to neutral position at all times for returning it automatically upon release thereof to disconnect said clutch operating mechanism from said source of hydraulic pressure.

12. In a milling machine of the vertical spindle type, a column, a spindle head slidably mounted on said column, a tool spindle rotatably mounted in vertical position in said sliding head, an elevating screw secured to said sliding head, an elevating nut rotatably mounted in said column in cooperating engagement with said screw, a nut actuating shaft disposed vertically in said column, gearing operatively connecting said vertical shaft to said elevating nut, manually operable means connected to actuate said vertical shaft for elevating said head, an adjustable transmission mechanism carried by said sliding head and operatively connected to drive said spindle, a shifting lever carried by said sliding head and operative to adjust said transmission mechanism, power actuated means in said column operatively connected to drive said transmission mechanism in said sliding head, hydraulically operated control mechanism mounted in said column and operatively connected to control said power actuated means, and means operatively connecting said shifting lever on said sliding head with said hydraulic control mechanism in said column, whereby said control mechanism may be actuated by said shifting lever regardless of the position of elevation of said sliding head.

13. In a milling machine of the vertical spindle sliding head type, a column, a spindle head slidably mounted on said column, a tool spindle rotatably mounted in vertical position in said sliding head, an elevating screw secured to said sliding head, an elevating nut rotatably mounted in said column in cooperating engagement with said screw, a nut actuating shaft disposed vertically in said column, gearing operatively connecting said vertical shaft to said elevating nut, a reversing mechanism including a shifting collar vertically slidable on said shaft, power driven means operatively connected to drive said reversing mechanism for moving said sliding head in either direction selectively, a power transmission mechanism mounted in said column and including speed changing apparatus, means for transmitting power from said speed changing apparatus in said column to said tool spindle including range changing mechanism carried by said sliding head, control mechanism in said column operatively connected to control said power transmission mechanism, means on said sliding head for adjusting said range changing mechanism, and means operatively connecting said range change adjusting means on said sliding head to said control mechanism in said column.

14. In a machine tool power transmission mechanism, a power controlling element movable to two positions effecting two different transmission results, power actuated means disposed to effect movement of said controlling element, a control device for said power actuated means, hydraulically actuated means arranged to move said control device to a position for effecting one transmission result but incapable of moving said device out of said position, and manually actuated means arranged to move said control device to the other position, the arrangement being such that one of said two transmission results can be effected only by actuation of said manual control means.

15. In a machine tool, an adjustable power transmission mechanism, a power actuated clutch arranged to drive said mechanism selectively, a control system for effecting adjustment of said transmission mechanism, a control valve associated with said control system hydraulic actuating means causing said valve to be moved in response to an adjusting movement of said system but only to a position effecting disengagement of said clutch said valve being retained in said clutch disengaging position subsequent to completion of said adjusting movement, and a control device independent of said transmission control system and mechanically connected to said clutch actuating control valve to move it to clutch engaging position selectively, whereby restarting of said machine may be effected only by actuation of said independent control device.

16. In a machine tool, an adjustable power transmission mechanism, a power actuated clutch arranged to drive said mechanism selectively, a control device arranged to be moved to clutch engaging or to clutch disengaging position and operative to effect corresponding power actuation of said clutch, an adjusting system for said transmission mechanism including control means operative upon an adjusting movement to effect movement of said control device to clutch disengaging position only said means being incapable of returning said device to clutch engaging position, and a separate clutch control lever independent of said adjusting system operative upon said control device in manner to move it to either position selectively, the arrangement being such that said control device may be moved to clutch engaging position only by said independent control means.

17. In a machine tool, an adjustable power transmission mechanism, a hydraulically actuated disconnecting clutch disposed to drive said transmission mechanism selectively, a control valve operatively connected to effect engagement or disengagement of said clutch selectively, manually actuated means arranged to operate said clutch control valve, control means arranged to effect adjustment of said transmission mechanism selectively, means for turning said mechanism slowly while it is being adjusted, a hydraulic control system associated with said adjusting control means and operative upon said clutch control valve to effect disengagement of said clutch upon an adjusting movement of said control means, and a relay valve connected with said hydraulic control system and operated thereby upon an adjusting movement to provide for actuating said means for turning said mechanism slowly upon said clutch being moved to disengaged position.

18. In a machine tool, an adjustable power transmission mechanism, means connected to drive said transmission mechanism including a hydraulically actuated disconnecting clutch, a brake associated with said clutch, a control valve operatively connected to effect disengagement of said brake and engagement of said clutch or disengagement of said clutch and engagement of said brake selectively, means to retain said clutch in either position, manually operable means arranged to actuate said clutch control valve, control means arranged to effect adjustment of said transmission mechanism, means for turning said transmission mechanism slowly while it is being adjusted, a hydraulic control system associated with said transmission adjusting means and operable upon said clutch controlling valve to effect disengagement of said clutch upon an adjusting movement of said adjusting means, and a relay valve connected with said hydraulic control system and operable upon an adjusting movement to prevent engagement of said brake when said clutch is disengaged and to effect energization of said means for turning said mechanism slowly while it is being adjusted.

19. In a machine tool, a power transmission mechanism including a hydraulically actuated brake, a source of hydraulic pressure for operating said brake, a control valve connected with said source of hydraulic pressure and operative selectively to admit pressure liquid for moving said brake to engaged position or to disengaged position, means associated with said brake to retain it in either position, a hydraulic passageway arranged to permit the escape of pressure liquid from said brake actuating mechanism upon the arrival of said brake at its engaged position, and means associated with said valve effective to close said escape passageway selectively, whereby the full pressure of said hydraulic source may be applied to force said brake firmly into engagement for stopping said transmission mechanism quickly.

20. In a machine tool, a power transmission train including speed changing mechanism, a source of power, a clutch selectively operative to connect said source of power to said speed changing mechanism, hydraulically operated clutch actuating means, a control valve operatively connected to control said clutch actuating means, manually operable means arranged to move said valve to clutch engaging and clutch disengaging positions alternatively, a lost motion mechanism operatively connecting said manually actuated means to said valve, manually actuating control means for adjusting said speed changing mechanism, means for turning said transmission mechanism slowly to facilitate adjustment, a control valve associated with said manually actuated speed changing means, and a control system operative in response to said speed changing control valve, said system operating when said clutch controlling valve is in clutch disengaging position to engage said slow speed drive mechanism and operating when said clutch controlling valve is in clutch engaging position to move said valve to a position effecting disengagement of said clutch before engaging said slow speed drive mechanism, said movement being effected without moving said manually actuated clutch controlling means by reason of the action of said lost motion mechanism.

21. In a machine tool transmission and control mechanism including speed changing apparatus, means to adjust said speed changing apparatus, a power source for driving said speed changing apparatus, auxiliary driving means to turn said speed changing apparatus slowly while it is being adjusted, a hydraulic control system operative to connect said power source to or disconnect it from said speed changing apparatus selectively, manually actuated means connected to operate said hydraulic control system, a valve associated with said speed changing apparatus and operative upon a speed changing movement thereof to act on said control system in manner to disconnect said power source and to engage said auxiliary driving means, and a relay valve operative in response to said speed changing apparatus valve upon a speed changing movement and functioning to condition said hydraulic system for control by said speed changing apparatus valve, said relay valve functioning at the conclusion of a speed changing operation to condition said hydraulic system for control by said manually actuated means.

22. In a machine tool transmission mechanism including alternatively operating clutch and brake devices, a hydraulic fluid control system arranged to actuate said devices, a control valve associated with said hydraulic system, said valve being movable to two positions in effecting engagement of said clutch or said brake selectively and including means permitting the escape of hydraulic fluid to limit the pressure applied to said devices, and means associated with said control valve and operative upon moving said valve to a third position to prevent the escape of hydraulic fluid, whereby additional pressure may be applied to said brake device to engage it firmly for stopping said mechanism quickly.

23. In a machine tool transmission and control mechanism, a source of power, an adjustable speed changing apparatus, a hydraulically actuated clutch disposed to connect said source of power to said speed changing apparatus selectively, a hydraulic control system associated with said clutch, a manually actuated clutch controlling valve operatively connected to said control system, a manually actuated speed selecting device operative to adjust said speed changing apparatus, a clutch controlling valve associated with said speed selecting device, and a selector valve operative in response to movement of said speed selecting device to condition said hydraulic control system for operation by its associated clutch controlling valve and operative upon completion of movement of said speed selecting device to condition said hydraulic control system for operation by said manually actuated clutch controlling valve.

24. In a machine tool transmission and control mechanism, an adjustable speed changing apparatus, a source of power for driving said apparatus, a hydraulically actuated clutch and brake mechanism disposed to connect said power source to drive said speed changing apparatus or alternatively to brake said speed changing apparatus, a hydraulic control system associated with said clutch and brake mechanism, a manually actuated clutch controlling valve connected to said control system and operative to engage said clutch or said brake selectively, a speed controlling device operatively connected to adjust said speed changing mechanism, a clutch controlling valve associated with said speed adjusting device, and a relay valve operative in response to actuation of said speed adjusting device to condition said hydraulic system to effect disengagement of both said clutch and said brake in response to actuation of the control valve associated with said speed adjusting device and upon completion of an adjustment to condition said system for operation by said manually actuated clutch and brake controlling valve.

25. In a hydraulic control system for a machine tool, a controlling valve, manually operable means for moving said valve, a lost motion mechanism operatively connecting said manually operable means to said valve to actuate it between two positions, and hydraulically actuated means arranged to move said valve to a third position through action of said lost motion mechanism without moving said manually operable means, said manually operable means functioning by returning said valve to the first position to take up the lost motion of said mechanism in manner to provide for moving said valve to the second position.

26. In a machine tool transmission mechanism, a hydraulic control system including a valve for movement to different positions for starting and stopping said machine, manually operable control means arranged to actuate said valve for controlling said machine, hydraulically actuated control means operative to actuate said valve in effecting speed changing control of said machine, and means to retain said valve in a position to stop said machine at the termination of a speed changing control cycle, whereby danger of accidentally starting said machine following a speed changing operation is obviated.

27. In a machine tool, the combination with a speed changing transmission mechanism including a clutch and a brake, of hydraulically actuated mechanism adapted to engage said clutch or said brake alternatively, control means for adjusting the speed of said transmission mechanism, means responsive to said control means and operative upon said hydraulic actuating mechanism to cause it to disengage both said clutch and said brake prerequisite to a speed changing operation, and independent manual control means operative upon said hydraulic actuating mechanism selectively to cause it to effect engagement of either said clutch or said brake alternatively.

28. In a machine tool having a power transmission train, the combination with driving mechanism including a clutch and a brake for starting or stopping the power transmission train of the machine, hydraulically actuated means for engaging said clutch or said brake alternatively, and manually actuatable remote control means operative upon said hydraulically actuated means to effect selective engagement of said clutch or said brake in controlling the operation of said machine.

29. In a machine tool including an adjustable power transmission mechanism, a hydraulically actuated disconnecting clutch arranged to drive said adjustable power transmission mechanism selectively, a control valve operatively connected to effect engagement or disengagement of said hydraulically actuated clutch selectively, manually actuated control means arranged to effect adjustment of said power transmission mechanism selectively, a hydraulic control system associated with said transmission adjusting control means and operative upon said clutch control valve to effect disengagement only of said clutch upon an adjusting movement of said control means, and manually actuated means connected to operate said control valve independently of said transmission adjusting means and exclusively operative upon said valve to effect reengagement of said clutch following an adjusting movement, the arrangement being such that said clutch cannot be reengaged by said transmission control means but only by said independent manually actuated means to obviate unintended restarting of said machine following adjustment of said transmission mechanism.

30. In a machine tool, a power transmission mechanism including speed adjusting means, driving mechanism including a disconnecting clutch selectively operable to actuate said transmission mechanism, a hydraulic control system for actuating said clutch including a manually and hydraulically operable clutch controlling valve, manually operable means arranged to operate said speed adjusting means, a hydraulic control system associated with said speed adjusting means and operative upon a speed adjusting movement thereof to effect movement of said clutch controlling valve to clutch disengaging position, means for retaining said valve in clutch disengaging position following completion of a speed adjusting movement, and manually actuated means selectively operable to move said valve to clutch engaging position, the arrangement being such that said valve cannot be moved to clutch engaging position by operation of said speed adjusting manually operable means.

31. In a machine tool power transmission mechanism, a hydraulic control system including a valve having a plunger movable to a plurality of positions for effecting different control results, manually actuated means connected to said valve plunger to move it to some of said positions, hydraulically actuated means arranged to move said valve plunger from some of said positions to another position, and valve passages cooperating with said plunger and arranged to render said hydraulically actuated plunger moving means inoperative when said plunger is moved by said manually actuated means to a predetermined one of said positions.

32. In a machine tool transmission mechanism a hydraulic control system including a control valve having a stop position a starting position and a speed changing position, manually operable means for moving said valve, a lost motion mechanism operatively connecting said manually operable means to said valve in manner to provide for actuating it between stop position and starting position, and hydraulically actuated means arranged to move said valve from starting position to speed changing position said lost motion mechanism permitting said movement without requiring movement of said manually operable means, the arrangement being such that said manually operable means may be actuated to return said valve to stop position in order to take up the lost motion of said mechanism to provide for subsequent movement of said valve to starting position.

33. In a machine tool transmission and control mechanism, a source of power, an adjustable speed changing apparatus, a hydraulically actuated clutch and brake mechanism operative selectively to connect said source of power to drive said speed changing apparatus or alternatively to effect a braking action upon said speed changing apparatus, a hydraulic control system connected to actuate said clutch and brake mechanism, a manually or hydraulically actuated clutch controlling valve connected to said control system and movable manually to positions operative to effect engagement of said clutch or of said brake selectively, a speed controlling device operatively connected to adjust said speed changing mechanism, a control valve associated with said speed controlling device, a hydraulic control connection between said control valves and operative when said clutch controlling valve is in brake engaging position to effect disengagement of said brake upon initiation of a speed controlling operation, said hydraulic control connection being so arranged that when said clutch controlling valve is in clutch engaging position said valve will be moved hydraulically by action of said speed controlling device control valve upon initiating a speed controlling operation to a third position to condition said control system for effecting disengagement of both said clutch and said brake for facilitating speed changing.

JOSEPH B. ARMITAGE.
THEODORE F. ESERKALN.